US012293754B2

(12) United States Patent
Li et al.

(10) Patent No.: US 12,293,754 B2
(45) Date of Patent: May 6, 2025

(54) ACTIVE NOISE CONTROL METHOD AND SYSTEM FOR HEADPHONE

(71) Applicant: Bestechnic (Shanghai) Co., Ltd., Shanghai (CN)

(72) Inventors: Qian Li, Shanghai (CN); Zhicong Wang, Shanghai (CN); Xingqiang Wu, Shanghai (CN)

(73) Assignee: BESTECHNIC (SHANGHAI) CO., LTD., Shanghai (CN)

( * ) Notice: Subject to any disclaimer, the term of this patent is extended or adjusted under 35 U.S.C. 154(b) by 245 days.

(21) Appl. No.: 17/883,759

(22) Filed: Aug. 9, 2022

(65) Prior Publication Data

US 2023/0087943 A1 Mar. 23, 2023

(30) Foreign Application Priority Data

Sep. 18, 2021 (CN) .......................... 202111101300.5
Nov. 5, 2021 (CN) .......................... 202111305486.6

(51) Int. Cl.
*H04R 1/10* (2006.01)
*G10K 11/178* (2006.01)

(52) U.S. Cl.
CPC .. *G10K 11/17854* (2018.01); *G10K 11/17823* (2018.01); *G10K 11/17825* (2018.01); *G10K 11/17881* (2018.01); *H04R 1/1083* (2013.01); *G10K 2210/1081* (2013.01); *G10K 2210/30231* (2013.01); *G10K 2210/3026* (2013.01); *G10K 2210/3027* (2013.01); *G10K 2210/3028* (2013.01); *G10K 2210/3056* (2013.01); *H04R 2460/01* (2013.01)

(58) Field of Classification Search
CPC ....... G10K 11/17854; G10K 11/17823; G10K 11/17825; G10K 11/17881; G10K 2210/1081; G10K 2210/30231; G10K 2210/3026; G10K 2210/3027; G10K 2210/3028; G10K 2210/3056; G10K 2210/3025; G10K 2210/30391; G10K 11/17817; G10K 11/17835; G10K 11/17885; H04R 1/1083; H04R 2460/01; H04R 2460/03
USPC ........................................................ 381/71.6
See application file for complete search history.

(56) References Cited

U.S. PATENT DOCUMENTS

2010/0272284 A1* 10/2010 Joho ................ G10K 11/17853 381/71.8
2022/0076656 A1* 3/2022 He ....................... H04R 1/1083

(Continued)

*Primary Examiner* — Carolyn R Edwards
*Assistant Examiner* — Friedrich Fahnert
(74) *Attorney, Agent, or Firm* — Bayes PLLC

(57) ABSTRACT

In certain aspects, an active noise control (ANC) method and system for a headphone are disclosed. It is determined whether a music signal is played by a speaker of the headphone. Responsive to the music signal not being played by the speaker and a noise level of an ambient noise signal being greater than a noise threshold, a set of noise feedforward (FF) signals is obtained based on a set of FF microphone signals acquired by a set of FF microphones of the headphone. A noise feedback (FB) signal is obtained based on a first FB microphone signal acquired by a FB microphone of the headphone. A set of leakage monitoring parameters is obtained based on the set of noise FF signals and the noise FB signal. A set of FF filter parameters for a set of FF filters is adjusted based on the set of leakage monitoring parameters.

20 Claims, 21 Drawing Sheets

(56) References Cited

U.S. PATENT DOCUMENTS

| | | | | |
|---|---|---|---|---|
| 2022/0157291 | A1* | 5/2022 | McCutcheon ... | G10K 11/17881 |
| 2022/0343886 | A1* | 10/2022 | McCutcheon ... | G10K 11/17854 |
| 2022/0383848 | A1* | 12/2022 | Darlington ......... | G10K 11/1783 |
| 2023/0087943 | A1* | 3/2023 | Li .................... | G10K 11/17835<br>381/71.6 |
| 2024/0054986 | A1* | 2/2024 | Matsuo ............ | G10K 11/17881 |

* cited by examiner

ACTIVE NOISE CONTROL METHOD AND SYSTEM FOR HEADPHONE

CROSS-REFERENCE TO RELATED APPLICATIONS

This application claims the benefit of priorities to Chinese Patent Application No. 202111101300.5, filed on Sep. 18, 2021, and Chinese Patent Application No. 202111305486.6, filed on Nov. 5, 2021, both of which are incorporated herein by reference in their entireties.

BACKGROUND

The present disclosure relates to an active noise control (ANC) method and system for a headphone.

Headphones are widely used by users to enjoy comfortable and enjoyable music listening experience in various noisy environments such as airports, subways, airplanes, restaurants, etc. However, even for the same headphone, a structure difference in each user's ear and ear canal (such as different ear canal lengths, different ear canal widths, reflections, etc.) may cause a different degree of leakage in the headphone, which can weaken an ANC effect of the headphone and affect the user's listening experience. Besides, different wearing manners of the headphone (such as different wearing tightness, different wearing directions, etc.) may also lead to a leakage in the headphone and affect the sound field of the headphone within the ear. The ANC performance of the headphone can be affected, and the user's listening experience through the headphone can be downgraded.

SUMMARY

According to one aspect of the present disclosure, an ANC method for a headphone is disclosed. It is determined whether a music signal is played by a speaker of the headphone. Responsive to the music signal not being played by the speaker and a noise level of an ambient noise signal being greater than a noise threshold, a set of noise feedforward (FF) signals is obtained based on a set of FF microphone signals acquired by a set of FF microphones of the headphone. A noise feedback (FB) signal is obtained based on a first FB microphone signal acquired by a FB microphone of the headphone. A set of leakage monitoring parameters is obtained based on the set of noise FF signals and the noise FB signal. A set of FF filter parameters for a set of FF filters to implement an ANC function in the headphone is adjusted based on the set of leakage monitoring parameters.

According to another aspect of the present disclosure, a headphone with an ANC function is disclosed. The headphone includes a speaker configured to play at least one of a music signal or an ambient noise signal. The headphone includes a set of FF microphones configured to acquire a set of FF microphone signals. The headphone further includes an FB microphone configured to acquire a first FB microphone signal responsive to the ambient noise signal being played by the speaker. The headphone further includes a set of FF filters configured to implement the ANC function in the headphone. The headphone additionally includes a processor configured to determine whether the music signal is played by the speaker of the headphone. Responsive to the music signal not being played by the speaker and a noise level of the ambient noise signal being greater than a noise threshold, the processor is further configured to obtain a set of noise FF signals based on the set of FF microphone signals; obtain a noise FB signal based on the first FB microphone signal; determine a set of leakage monitoring parameters based on the set of noise FF signals and the noise FB signal; and adjust a set of FF filter parameters for the set of FF filters based on the set of leakage monitoring parameters.

According to yet another aspect of the present disclosure, an ANC system for a headphone is disclosed. The ANC system includes a memory storing code and a processor coupled to the memory. When the code is executed, the processor is configured to determine whether a music signal is played by a speaker of the headphone. Responsive to the music signal not being played by the speaker and a noise level of an ambient noise signal being greater than a noise threshold, the processor is further configured to obtain a set of noise FF signals based on a set of FF microphone signals acquired by a set of FF microphones of the headphone; obtain a noise FB signal based on a first FB microphone signal acquired by an FB microphone of the headphone; determine a set of leakage monitoring parameters based on the set of noise FF signals and the noise FB signal; and adjust a set of FF filter parameters for a set of FF filters to implement an ANC function in the headphone based on the set of leakage monitoring parameters.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

Figure 1:
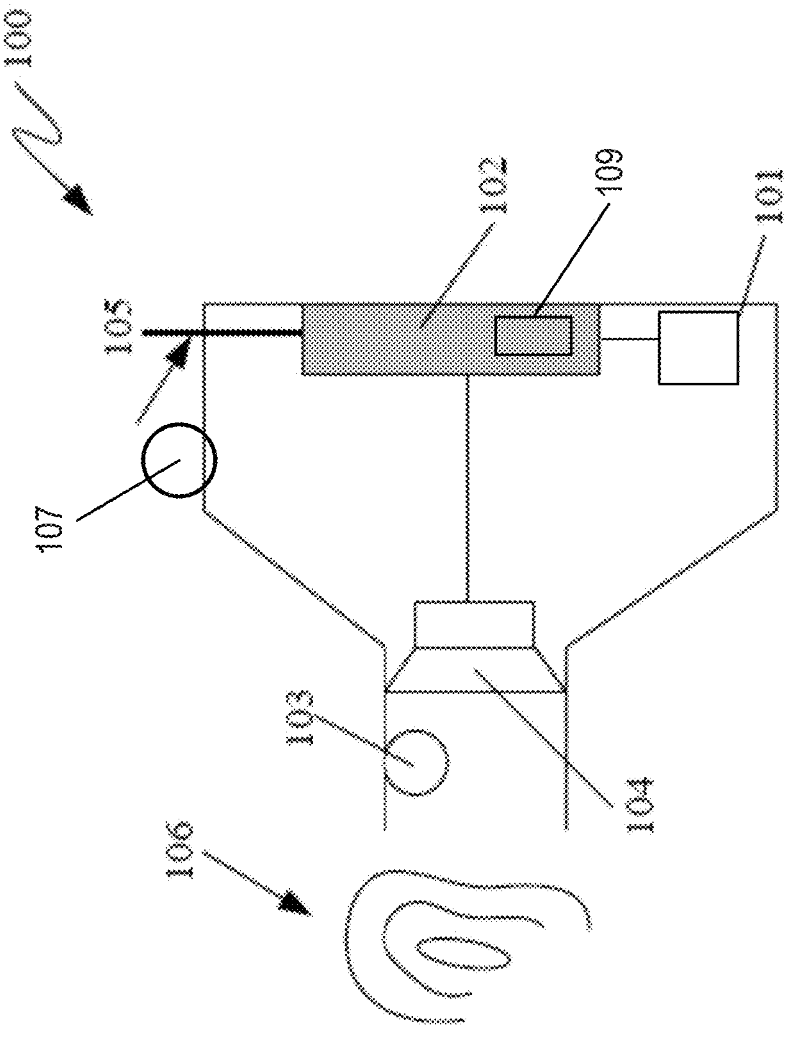
FIG. 1 illustrates a block diagram of an exemplary headphone with an ANC function, according to some aspects of the present disclosure.

The present disclosure will be described with reference to the accompanying drawings.

DETAILED DESCRIPTION

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present disclosure.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In an existing noise reduction design for a headphone, an audio alert can be issued to prompt a user to adjust the wearing manner of the headphone when a sound leakage is detected in the headphone. For example, the audio alert may recommend the user to wear the headphone more tightly. Then, a better noise reduction effect can be achieved if the user follows the instruction and changes the wearing manner of the headphone. However, the user may select to ignore the audio alert sometimes. Even if the user follows the instruction to adjust the wearing manner of the headphone, the headphone may not be worn by the user to a degree of tightness sufficient enough for achieving the noise reduction effect. For example, the tightness of the headphone may cause discomfort to the user who usually likes to wear the headphone loosely. In another example, the headphone may be loosened due to walking or head shaking of the user during the usage of the headphone, resulting in an increased leakage in the headphone. In either case, if the audio alert is prompted repeatedly to instruct the user to wear the headphone tightly, it can be annoying, and the user experience of the headphone is downgraded. On the other hand, if the leakage of the headphone is not corrected or compensated, the noise reduction effect of the headphone can be deteriorated, leading to a downgraded listening experience of the headphone.

Further, a transfer function of a headphone can be changed greatly due to different wearing manners of the headphone, which makes an FF noise reduction effect of the headphone unstable. In this case, the headphone mainly relies on an FB filter to reduce the noise. However, the noise reduction bandwidth of the FB filter is relatively narrow, and the FB noise reduction effect is relatively poor.

To address one or more of the issues discussed above, the present disclosure disclosed herein provides an ANC method and system that can compensate for a leakage of a headphone to achieve an improved ANC function. The listening experience of the headphone can be improved for different users (e.g., with different ear canal structures) in different usage scenarios (e.g., with different wearing manners in different environments). The ANC method and system disclosed herein are implemented based on ambient noise or played music signals to achieve the ANC function, which is insensitive to the user (e.g., without any interruption or interference to the user's usage of the headphone), thereby greatly improving the user experience of the headphone.

For example, the ANC method and system disclosed herein can utilize a music signal played by the headphone and a music FB signal obtained from an FB loop to implement the ANC function. In this case, it does not need to deliberately prompt the user to check the wearing tightness of the headphone even if the leakage is detected in the headphone. Thus, an improved ANC effect can be achieved without changing the wearing manner of the headphone. Also, by using the music signal played by the headphone for the ANC function, it has no need to play any extra audio signal designated for the ANC, so that any discomfort that may be incurred by the playing of the extra audio signal can be avoided. Thus, the listening experience of the headphone can be improved.

In another example, the ANC method and system disclosed herein can utilize an FF loop with a set of FF paths to implement the ANC function. The set of FF paths may include a set of FF microphones and a set of FF filters, respectively (e.g., each FF path may include a corresponding FF microphone and a corresponding FF filter). The set of FF paths can be treated as a set of independent FF noise reduction paths, whose FF filter configurations can be conveniently and adaptively configured for different wearing manners. This adaptive adjustment of the FF paths can solve the issue of unstable FF noise reduction effect under different headphone wearing manners. Thus, the ANC effect of the headphone can be improved, and the listening experience of the headphone can be enhanced for the user.

In some implementations, the set of FF filters in the set of FF paths can be tuned for the ANC function sequentially, and a set of leakage monitoring parameters can be determined for the set of FF filters sequentially based on the sequential tuning of the set of FF filters. Then, a set of FF filter parameters for the set of FF filters can be adjusted sequentially based on the sequential determination of the set of leakage monitoring parameters. As a result, the set of FF filters can be adaptively adjusted to appropriate ANC settings one by one to achieve the improved ANC function disclosed herein. In an exemplary scenario when the user wears the headphone but does not play any music, an improved ANC effect can also be achieved through (a) the determination of the leakage monitoring parameters based on an ambient noise signal and (b) the sequential adjustment of the FF filters based on the leakage monitoring parameters.

Through the application of the set of independent FF noise reduction paths (e.g., with the set of FF filters adjusted to the appropriate ANC settings), an ambient noise signal from an external environment can be separately acquired by the set of FF microphones and processed by the set of FF filters to generate a set of FF-filtered noise signals, respectively. The set of FF-filtered noise signals can be aggregated into a combined noise signal and played by a speaker of the headphone. For example, the combined noise signal can be an average or a sum of the set of FF-filtered noise signals, which are random noises and independent from each other. Thus, a noise floor of the ANC method and system disclosed herein can be reduced due to the aggregation operation of the noise signals. A signal-to-noise ratio (SNR) of the headphone can be effectively improved. Besides, an existing high SNR (e.g., 69 dB) requirement on the FF microphones can be lowered due to the improved SNR of the headphone, so that the cost of the headphone can be reduced.

FIG. 1 illustrates a block diagram of an exemplary headphone 100 with an ANC function, according to some aspects of the present disclosure. Headphone 100 may be a wired (or wireless) loudspeaker that can be worn on (or around) a head of a user over (or inside) an ear 106 of the user. In some implementations, headphone 100 may be an earbud (also known as an earpiece), an open earphone, a semi-open earphone, or a wireless headphone that can be plugged into the user's ear canal when headphone 100 is worn by the user. In some implementations, headphone 100 may be part of a headset, which is physically held by a band over the head of the user. Headphone 100 may include an audio receiving unit 105, a processor 102, a memory 101, an FF microphone (MiC) set 107, an FB microphone 103, a speaker 104, and any other suitable components.

Audio receiving unit 105 may be an antenna for wirelessly receiving an audio signal from an audio source (not shown) or an audio cable connected to the audio source for transmitting the audio signal to processor 102. The audio source may include, but not limited to, a handheld device (e.g., dumb or smart phone, tablet, etc.), a wearable device (e.g., eyeglasses, wrist watch, etc.), a radio, a music player, an electronic musical instrument, an automobile control station, a gaming console, a television set, a laptop computer, a desktop computer, a netbook computer, a media center, a set-top box, a global positioning system (GPS), or any other suitable device. In some implementations, the audio signal may include a music signal from a music source, such as a phone or a music player.

Speaker 104 may be any suitable electroacoustic transducer that converts an electrical signal (e.g., representing the audio information provided by the audio source) to a corresponding audio sound. In some implementations, speaker 104 may be configured to play audio based on the audio signal.

FB microphone 103 may be any transducer that converts an audio sound into an electrical signal (referred to as a microphone signal herein). FB microphone 103 may be disposed inside the ear canal when headphone 100 is worn by the user, and is configured to obtain an FB microphone signal based on the audio played by speaker 104. That is, by disposing FB microphone 103 inside the user's ear canal, any sound in the ear canal can be obtained by FB microphone 103, which includes the audio signal currently being played by speaker 104 and any noise that enters the ear canal (e.g., due to a loose wearing manner of the headphone).

FF microphone set 107 may include a set of FF microphones disposed on the outside of headphone 100. FF microphone set 107 may be configured to capture an ambient noise signal surrounding the outside of headphone 100 and acquire a set of FF microphone signals thereof. That is, by disposing the set of FF microphones outside headphone 100 in different locations, an ambient noise signal in the environment can be captured by the set of FF microphones from different directions to generate a set of FF microphone signals, respectively. The ambient noise signal may include any environmental noise, a music signal component leaked to the external environment when a music signal is played by speaker 104, or a combination thereof.

Processor 102 may be coupled to memory 101. In some implementations, processor 102 may be configured to perform the ANC function disclosed herein. Processor 102 may include any appropriate type of microprocessor, central processing unit (CPU), graphics processing unit (GPU), digital signal processor, or microcontroller suitable for audio processing. Processor 102 may include one or more hardware units (e.g., portion(s) of an integrated circuit) designed for use with other components or to execute part of an audio processing program. The program may be stored on a computer-readable medium, and when executed by processor 102, it may perform one or more functions disclosed herein. Processor 102 may be configured as a separate processor module dedicated to performing leakage compensation. Alternatively, processor 102 may be configured as a shared processor module for performing other functions unrelated to the ANC.

Processor 102 may be a complex instruction set computing (CISC) microprocessor, a reduced instruction set computing (RISC) microprocessor, a very long instruction word (VLIW) microprocessor, a processor executing any other type of instruction sets, or a processor that executes a combination of different instruction sets. In some implementations, processor 102 may be a special-purpose processor rather than a general-purpose processor. Processor 102 may include one or more special-purpose processing devices, such as application-specific integrated circuits (ASICs), field programmable gate arrays (FPGAs), digital signal processors (DSPs), systems on a chip (SoCs), and the like.

In some implementations, processor 102 may include an ANC module 109 configured to perform the ANC function disclosed herein. ANC module 109 is described below in more detail with reference to FIGS. 4A-7.

Memory 101 may include any appropriate type of mass storage provided to store any type of information that processor 102 may need to operate. For example, memory 101 may be a volatile or non-volatile, magnetic, semiconductor-based, tape-based, optical, removable, non-removable, or other type of storage device or tangible (i.e., non-transitory) computer-readable medium including, but not limited to, a Read-Only Memory (ROM), a flash memory, a dynamic Random Access Memory (RAM), and a static RAM. Memory 101 may be configured to store one or more computer programs that may be executed by processor 102 to perform functions disclosed herein. Memory 101 may be further configured to store information and data used by processor 102.

FIGS. 2A-2D illustrate block diagrams of various exemplary implementations of a headphone with an ANC function, according to some aspects of the present disclosure. The headphone in any of FIGS. 2A-2D may be an example of headphone 100 in FIG. 1, and the similar description will not be repeated herein. It is understood that not every component shown in FIGS. 2A-2D may be needed for different embodiments.

Figure 2A:
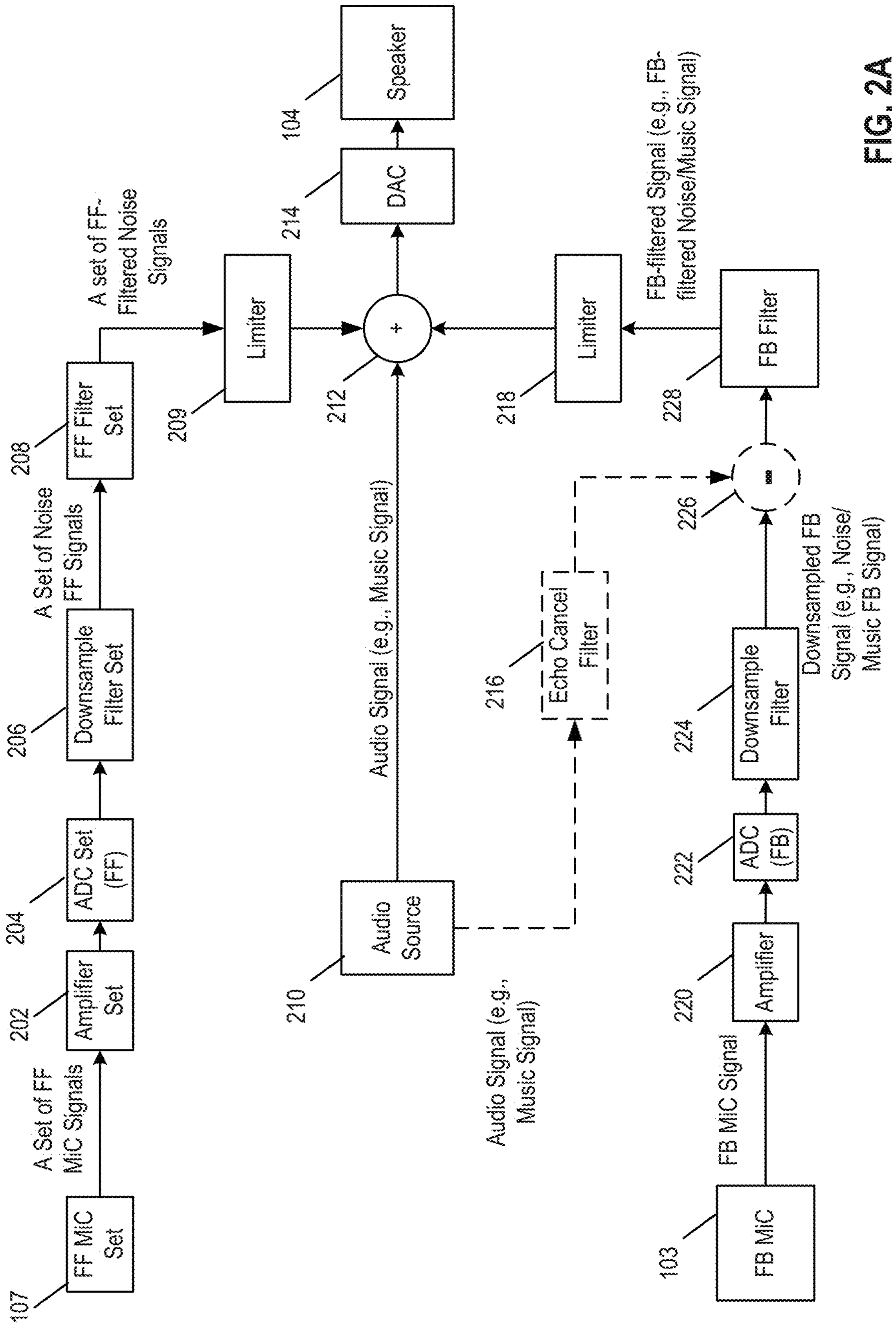
FIGS. 2A-2D illustrate block diagrams of various exemplary implementations of a headphone with an ANC function, according to some aspects of the present disclosure.

Referring to FIG. 2A, the headphone may include an audio source 210, an FB loop, an FF loop, a digital-to-analog converter (DAC) 214, and speaker 104. Audio source 210 can provide an audio signal (e.g., a music signal) to the headphone, for example, via an antenna or an audio cable (e.g., audio receiving unit 105 shown in FIG. 1). In some implementations, the audio signal is a digital signal that can be converted by DAC 214 to an analog signal and played by speaker 104. That is, speaker 104 may play an audio based on the audio signal in an analog format.

The FB loop may include FB microphone 103, an amplifier 220, an analog-to-digital converter (ADC) a downsample filter 224, an FB filter 228, and a limiter 218. In some implementations, in the FB loop, the audio played by speaker 104 can be obtained by FB microphone 103 along with environmental noises in the ear canal in which FB microphone 103 is disposed. FB microphone 103 can generate an FB microphone signal including at least one of: (a) a noise FB microphone signal associated with an ambient noise signal; (b) a music FB microphone signal based on the music signal being played by speaker 104; or (c) a combination of the noise FB microphone signal and the music FB microphone signal. That is, the FB microphone signal obtained by FB microphone 103 is based on either the audio of interest (e.g., the music signal) or the noise to be reduced or removed, or a combination of both, according to some implementations. In some implementations, the FB microphone signal may be amplified (e.g., with a rate between 0-1) by amplifier 220. In some implementations, the FB microphone signal is an analog signal that can be converted by ADC 222 to a digital signal. In some implementations, the FB microphone signal can further be downsampled by downsample filter 224 to generate a downsampled FB signal, which may include at least one of a noise FB signal, a music FB signal, or a combination of both. The downsampling operation may reduce the order of the filter and thus reduce the size of the functioning circuit of the headphone, and therefore the production cost is reduced.

FB filter 228 may be operatively coupled to downsample filter 224. FB filter 228 may be any suitable digital filters, such as a finite impulse response (FIR) filter, an infinite impulse response (IIR) filter, or a combination of FIR and IIR filters. In some implementations, FB filter 228 may be configured to receive the downsampled FB signal (e.g., the noise FB signal, the music FB signal, or a combination of both) from downsample filter 224 and generate an FB-filtered signal (e.g., an FB-filtered noise signal, an FB-filtered music signal, or a combination of both). FB filter 228 may be a static filter or an adaptive filter.

Limiter 218 may be configured between FB filter 228 and an adder 212. Limiter 218 may be arranged before DAC 214 to perform the anti-saturation function to compress the amplitude of the signal, for example, by dynamic range compression (DRC) when it is above a threshold, thereby avoiding saturation of low-frequency noise, e.g., below 100 Hz. The low-frequency noise can be caused by, for example, motion (e.g., bumps on the road) and touching the microphones. The low-frequency noises can have relatively large amplitudes, which can cause saturation in the FB loop, the FF loop, or both. For example, limiter 218 may have a first signal amplitude threshold T1, a second signal amplitude threshold T2, and a third signal amplitude threshold T3, which have values from small to large, respectively, in this order. When the amplitude of the input signal of limiter 218 is between the first and third signal amplitude thresholds T1 and T3, the amplitude of the output signal of limiter 218 may be compressed to a value between the first and second signal amplitude thresholds T1 and T2. When the amplitude of the input signal of limiter 218 is above the third signal amplitude threshold T3, the amplitude of the output signal of limiter 218 may be compressed to the second signal amplitude threshold T2. When the amplitude of the input signal of limiter 218 is below the first signal amplitude threshold T1, limiter 218 may not compress the amplitude of the input signal.

In some implementations, the FB loop may optionally include an echo-cancel filter 216 and a subtracter 226 (illustrated using dashed lines in FIG. 2A). Echo-cancel filter 216 may be configured to reduce the music FB microphone signal included in the FB microphone signal based on the music signal from audio source 210 to generate an echo-cancelled audio signal. In some implementations, echo-cancel filter 216 is able to minimize or even remove the music FB signal from the downsampled FB signal outputted by downsample filter 224. For example, an output signal from echo-cancel filter 216 can be subtracted from the downsampled FB signal (e.g., the music FB signal or a combination of the music FB signal and the noise FB signal) through subtracter 226 for generating the echo-cancelled audio signal. In some implementations, echo-cancel filter 216 may be any suitable digital filters, such as an FIR filter, an IIR filter, or a combination of FIR and IIR filters. In this, the echo-cancelled audio signal is fed to FB filter 228 to generate the FB-filtered signal.

The FF loop may include FF microphone set 107, an amplifier set 202, an ADC set 204, a downsample filter set 206, an FF filter set 208, and a limiter 209. FF microphone set 107 may include a set of FF microphones (e.g., one or more FF microphones) disposed in different locations on the outside of the headphone. Correspondingly, amplifier set 202 may include a set of amplifiers (e.g., one or more amplifiers); ADC set 204 may include a set of ADCs (e.g., one or more ADCs); downsample filter set 206 may include a set of downsample filters (e.g., one or more downsample filters); and FF filter set 208 may include a set of FF filters (e.g., one or more FF filters). The FF loop may include a set of FF paths, with each FF path including an FF microphone from FF microphone set 107, an amplifier from amplifier set 202, an ADC from ADC set 204, a downsample filter from downsample filter set 206, and an FF filter from FF filter set 208. For example, the FF loop may include an FF path as shown below in FIG. 2B. In another example, the FF loop may include two FF paths as shown below in FIG. 2C or 2D. In yet another example, the FF loop may include four FF paths as shown below in FIG. 3A or 3B. It is contemplated that the FF loop may include any number of FF paths, which is not limited herein.

FF filter set 208 may be operatively coupled to downsample filter set 206. FF filter set 208 may include any suitable digital filters, such as FIR filters, IIR filters, or a combination of FIR and IIR filters. Limiter 209 may have a structure like that of limiter 218, and the similar description is not repeated herein.

In some implementations, as described below in more detail with reference to FIGS. 4A-4D, ANC module 109 may determine a set of leakage monitoring parameters, and adjust a set of FF filter parameters for a set of FF filters in FF filter set 208 based on the set of leakage monitoring parameters, so that an improved ANC function can be achieved. For example, the set of FF filters can be tuned for the ANC function sequentially, and the set of leakage monitoring parameters can be determined sequentially based on the sequential tuning of the set of FF filters. The set of FF filter parameters for the set of FF filters can be adjusted sequentially based on the sequential determination of the set of leakage monitoring parameters. In some implementations, the FF filters are adaptive filters. An FF filter parameter of a filter may include, but is not limited to, a filter type (e.g., a time-domain filter or a frequency-domain filter), a filter order, a filter coefficient (e.g., a self-adaptive filter coefficient), a filter response curve, a gain of the filter, etc. In some implementations, the set of FF filter parameters may be adaptively adjusted in real time or near real time.

In some implementations, as described below in more detail reference to FIGS. 5-6, ANC module 109 may determine a leakage condition parameter of the headphone based on the music signal and the music FB signal. ANC module 109 may adjust an FF filter parameter for at least an FF filter in FF filter set based on the leakage condition parameter and a predetermined matching relationship between a group of reference filter parameters and a group of reference leakage condition parameters, so that an improved ANC function can be achieved.

In some implementations, a set of FF microphone signals may be obtained by FF microphone set 107 disposed outside the ear canal of the user when the headphone is worn. For example, FF microphone set 107 may generate the set of FF microphone signals based on an ambient noise signal present in the external environment. In some implementations, the set of FF microphone signals may be amplified (e.g., with a weight between 0-1) by amplifier set 202. In some implementations, the set of FF microphone signals includes a set of analog signals that can be converted by ADC set 204 to a set of digital signals. In some implementations, the set of digital signals may further be downsampled by downsample filter set 206 to generate a set of noise FF signals. This downsampling operation may reduce the order of the filter and thus reduce the size of the functioning circuit of the headphone and reduce the cost. When FF filters in FF filter set 208 are already tuned for the ANC function, FF filter set 208 may be configured to receive the set of noise FF signals from downsample filter set 206 and generate a set of FF-filtered noise signals accordingly. The set of FF-filtered noise signals generated by FF filter set 208 may be aggregated together to generate a combined noise signal through adder 212. The combined noise signal may be processed by limiter 209.

As shown in 2A, the headphone may implement the ANC function through the FF loop, the FB loop, or a combination of the FF loop and the FB loop. The activation of FF filter set 208, FB filter 228, and/or echo cancel filter 216 for the ANC function may be determined based on, for example, the actual noise reduction need, a trade-off between the ANC effect and the power consumption, or a trade-off between the ANC effect and a time duration needed to achieve the ANC function, etc. For example, when a noise level of the ambient noise signal is relatively large (e.g., greater than a noise threshold), FF filter set 208 in the FF loop may be activated. In this case, if there is no music signal played by speaker 104, and FB filter 228 is also activated, echo cancel filter 216 in the FB loop may be deactivated to save the power consumption. If there is a music signal played by speaker 104, and FB filter 228 in the FB loop is also activated, echo cancel filter 216 may be activated. That is, when the FF loop is activated for the ANC function, a residual noise signal may still exist even if the ambient noise signal is already processed by FF filters in the FF loop. In this case, the FB loop can also be activated and applied for the ANC function to further reduce or eliminate the residual noise signal, so that the ANC effect of the headphone can be further improved.

In some implementations, when the FF loop and the FB loop are activated for the ANC function, and each FF filter in FF filter set 208 is already tuned for the ANC function, a music signal from audio source 210 (which is to be played by speaker 104) may be added with the combined noise signal from the FF loop and the FB-filtered signal from the FB loop to generate a noise and music combined signal through adder 212. The combined noise signal and ambient noise that reaches the user's ear canal may be cancelled out with each other in the air to achieve the noise reduction effect. The FB-filtered signal from the FB loop can be generated as follows: (1) echo-cancelled filter 216 may be activated and configured to subtract the music FB microphone signal included in the FB microphone signal based on the music signal from audio source 210, with an output signal from echo-cancel filter 216 to be subtracted from the downsampled FB signal (e.g., the music FB signal or a combination of the music FB signal and the noise FB signal) through subtracter 226 to generate an echo-cancelled audio signal; (2) the echo-cancelled audio signal may be processed by FB filter 228 to generate the FB-filtered signal. In this case, the impact of the FB ANC on the low frequency part of the music signal can be avoided. The noise and music combined signal may be processed by DAC 214 and then played by speaker 104, so that an ANC effect can be improved in the headphone. Therefore, the listening experience of the headphone can be enhanced.

Consistent with the present disclosure, a set of FF microphone noise floor signals (as well as the set of FF-filtered noise signals) are random noises. By aggregating the set of FF-filtered noise signals (e.g., N FF-filtered noise signals) to generate the combined noise signal, a noise floor of the FF loop may increase by times of $\sqrt{N}$ whereas a signal strength of the FF loop may increase by times of N, where N denotes a total number of FF paths in the headphone. Thus, a signal-to-noise ratio (SNR) of the FF loop may increase by $20 \log_{10}\sqrt{N}$. Thus, an existing high SNR requirement on the FF microphones (e.g., a high SNR of 69 dB) can be lowered, and a cost of the headphone can be reduced. Also, a noise floor of the entire ANC system can also be lowered.

Consistent with the present disclosure, a frequency band of interest mentioned herein may refer to a frequency band where the noise reduction effect is unstable. For example, for a noise-cancelling headset with two earmuffs connected by a band, the earmuffs have a relatively large size, and a change in the wearing manner of the headset may be relatively large when the headset is worn by a user at different times, leading to a relatively large change in a transfer function of the headset. Thus, a low-frequency noise reduction effect of the feedforward noise reduction may be unstable. Through experiments, it is found that a frequency band with the unstable low-frequency noise reduction effect in the feedforward noise reduction is concentrated in 100-2500 Hz. Therefore, the frequency band of interest disclosed herein may be set to be 100-2500 Hz. For example, a frequency band of interest for each downsample filter in downsample filter set 206 may be configured according to actual application needs. Considering that different headphone wearing manners may cause an unstable noise reduction effect of the filters in mid-low frequencies, an exemplary frequency band of interest for each downsample filter may be set in a range of 100-2500 Hz.

Figure 2B:
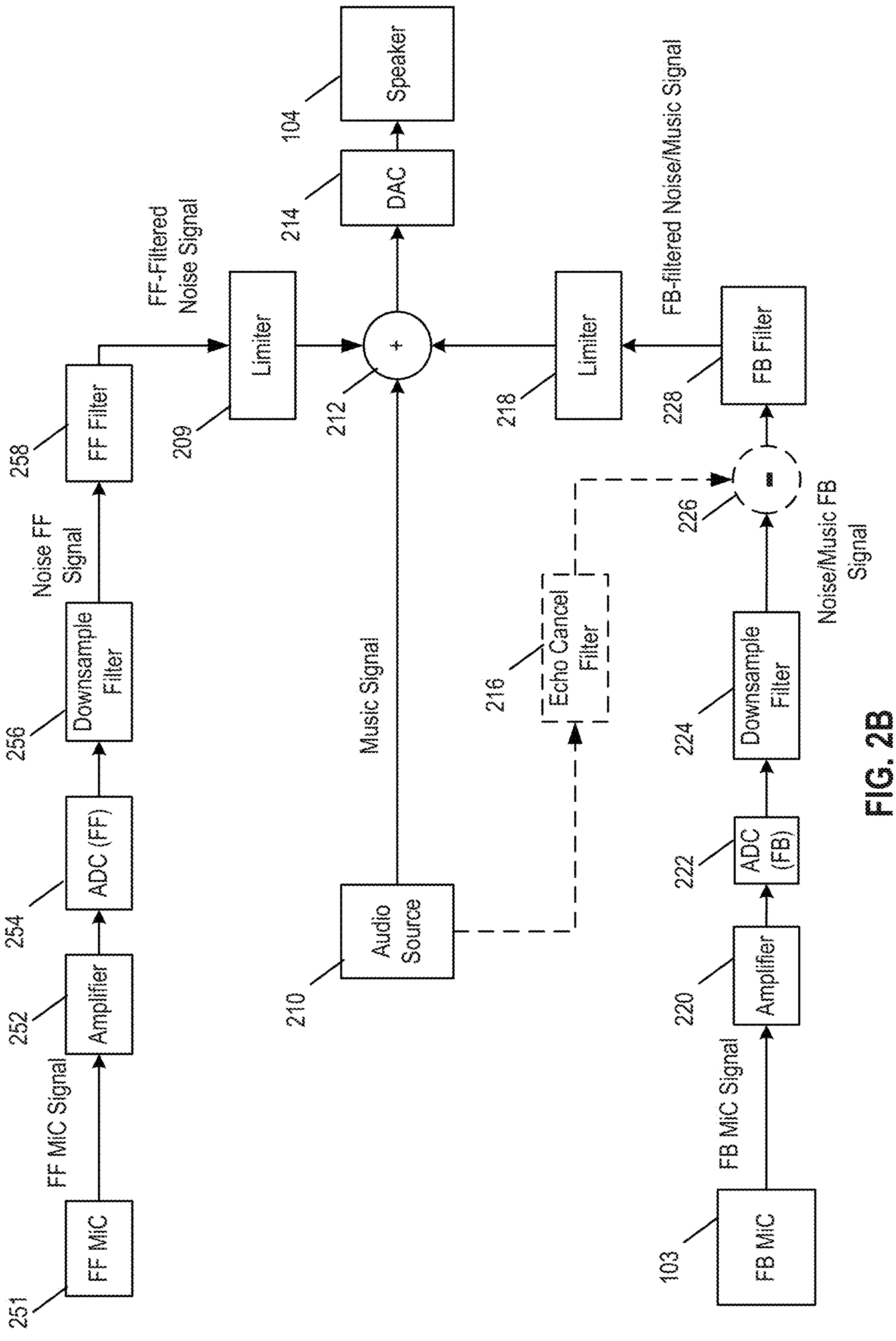

Referring to FIG. 2B, an FF loop of a headphone may include an FF path, which may include an FF microphone 251, an amplifier 252, an ADC 254, a downsample filter 256, and an FF filter 258. The headphone in FIG. 2B may have components like those of FIG. 1 or 2A, and the similar description will not be repeated herein. The headphone may also include any other appropriate components not shown in FIG. 2B, which is not limited herein.

In some implementations, an FF microphone signal may be obtained by FF microphone 251 disposed outside the ear canal of the user when the headphone is worn. For example, FF microphone 251 may generate an FF microphone signal based on an ambient noise signal present in the external environment. In some implementations, the FF microphone signal may be amplified (e.g., with a weight between 0-1) by amplifier 252. In some implementations, the FF microphone signal is an analog signal that can be converted by ADC 254 to a digital signal. In some implementations, the digital signal may further be downsampled by downsample filter 256 to generate a noise FF signal. This downsampling operation may reduce the order of the filter and thus reduce the size of the functioning circuit of the headphone. FF filter 258 may be configured to generate an FF-filtered noise signal based on the noise FF signal from downsample filter 256. Then, the FF-filtered noise signal may be processed by limiter 209.

In some implementations, as described below in more detail with reference to FIGS. 4A-4B, ANC module 109 may determine a leakage monitoring parameter and adjust an FF filter parameter for FF filter 258 based on the leakage monitoring parameter, so that an improved ANC function can be achieved. In some implementations, as described below in more detail with reference to FIGS. 5-6, ANC module 109 may determine a leakage condition parameter of the headphone based on a music signal and a music FB signal. ANC module 109 may adjust an FF filter parameter of FF filter 258 based on the leakage condition parameter and a predetermined matching relationship between a group of reference filter parameters and a group of reference leakage condition parameters, so that an improved ANC function can be achieved.

In some implementations, when the FF loop and the FB loop are activated for the ANC function and FF filter 258 is tuned for the ANC function, a music signal from audio source 210 (which is to be played by speaker 104) may be added with the FF-filtered noise signal from the FF loop and the FB-filtered signal from the FB loop to generate a noise and music combined signal through adder 212. The FF-filtered noise signal and the ambient noise that reaches the user's ear canal may be cancelled out with each other in the air to achieve the noise reduction effect. The FB-filtered signal from the FB loop can be generated as follows: (1) echo-cancel filter 216 may be activated and configured to subtract the music FB microphone signal included in the FB microphone signal based on the music signal from audio source 210, with an output signal from echo-cancel filter 216 to be subtracted from the downsampled FB signal through subtracter 226 to generate an echo-cancelled audio signal; (2) the echo-cancelled audio signal may be processed by FB filter 228 to generate the FB-filtered signal. In this case, the impact of the FB ANC on the low frequency part of the music signal can be avoided. The noise and music combined signal signal may be processed by DAC 214 and then played by speaker 104, so that an ANC effect can be improved in the headphone. Therefore, the listening experience of the headphone can be enhanced.

Figure 2C:
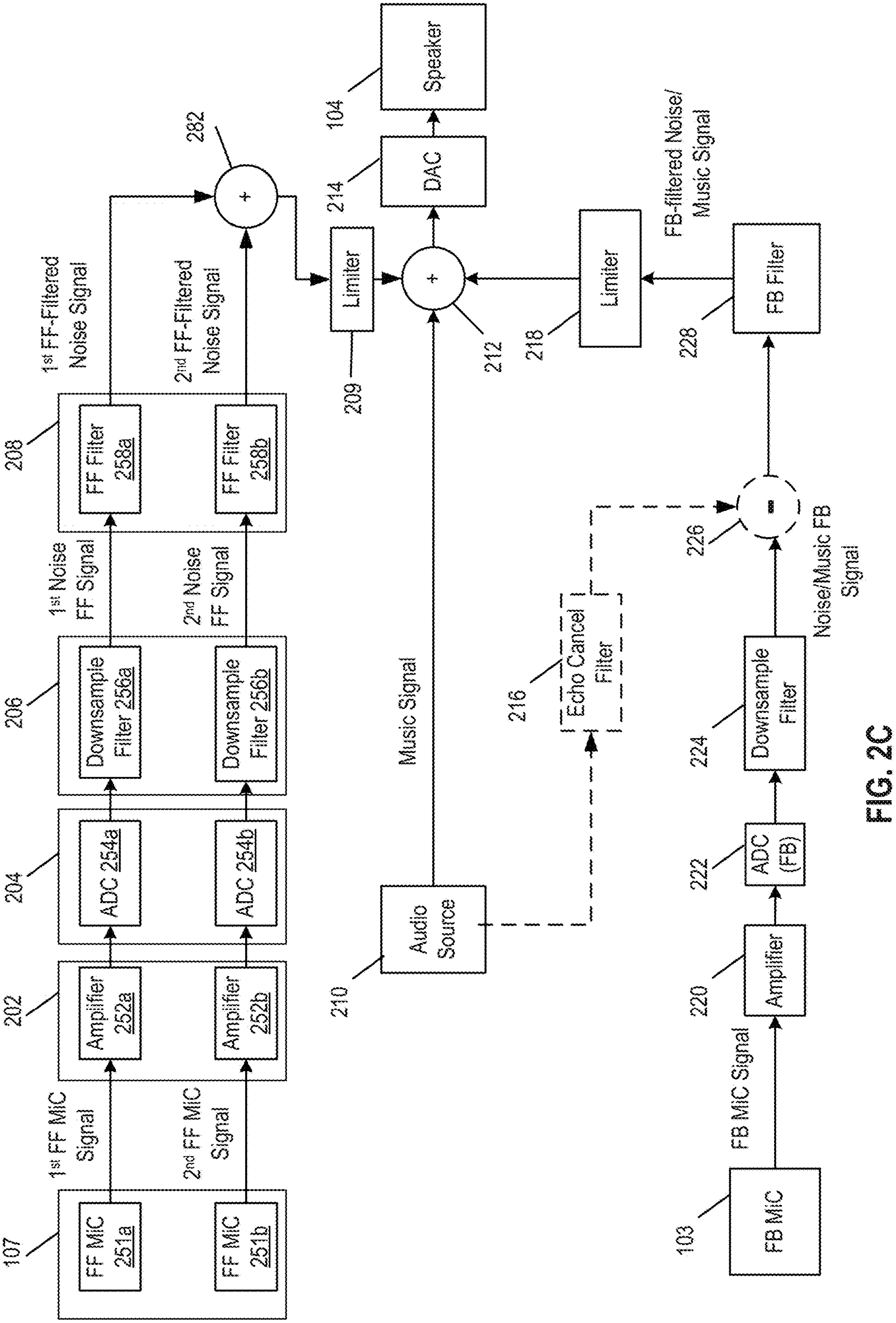

Referring to FIG. 2C, an FF loop of a headphone may include multiple FF paths. It is contemplated that although two FF paths are illustrated in FIG. 2C by way of examples, the FF loop may include three, four, or more FF loops, which is not limited herein. The headphone in FIG. 2C may have components like those of FIG. 1, 2A, or 2B, and the similar description will not be repeated herein. The headphone may also include any other appropriate components not shown in FIG. 2C, which is not limited herein.

With reference to FIG. 2C, FF microphone set 107 may include FF microphones 251*a* and 251*b;* amplifier set 202 may include amplifiers 252*a* and 252*b;* ADC set 204 may include ADCs 254*a* and 254*b;* downsample filter set 206 may include downsample filters 256*a* and 256*b*; and FF filter set 208 may include FF filters 258*a* and 258*b*. That is, a first FF loop may include FF microphone 251*a,* amplifier 252*a,* ADC 254*a,* downsample filter 256*a,* and FF filter 258*a*. A second FF loop may include FF microphone 251*b,* amplifier 252*b,* ADC 254*b,* downsample filter 256*b,* and FF filter 258*b*. The FF loop may also include an adder 282 and limiter 209.

In some implementations, as described below in more detail with reference to FIGS. 4C-4D, ANC module 109 may determine leakage monitoring parameters for the first and second FF paths, and adjust FF filter parameters for FF filters 258*a* and 258*b* based on the leakage monitoring parameters, so that an improved ANC function can be achieved. For example, initially, FF filter 258*a* can be tuned, and FF filter 258*b* can be kept in a current state (e.g., in a current setting). In some examples, the current state can be in a default setting or a non-default current setting of FF filter 258*b*. A first leakage monitoring parameter for the first FF path can be determined, and a first FF filter parameter for FF filter 258*a* can be adjusted based on the first leakage monitoring parameter. Subsequently, FF filter 258*a* is kept in a tuned state (e.g., the first FF filter parameter being already adjusted based on the first leakage monitoring parameter), and FF filter 258*b* can be tuned next. A second leakage monitoring parameter for the second FF path can be determined, and a second FF filter parameter for FF filter 258*b* can be adjusted based on the second leakage monitoring parameter.

In some implementations, as described below in more detail with reference to FIGS. 5-6, ANC module 109 may determine a leakage condition parameter of the headphone based on the music signal and the music FB signal. ANC module 109 may adjust an FF filter parameter for at least one of FF filter 258*a* or FF filter 258*b* based on the leakage condition parameter and a predetermined matching relationship between a group of reference filter parameters and a group of reference leakage condition parameters, so that an improved ANC function can be achieved.

In the first FF path, a first FF microphone signal may be obtained by FF microphone 251*a* based on an ambient noise signal when the headphone is worn by the user. The first FF microphone signal may be amplified by amplifier 252*a,* processed by ADC 254*a,* and downsampled by downsample filter 256*a* to generate a first noise FF signal. Similarly, in the second FF path, a second FF microphone signal may be obtained by FF microphone 251*b* based on the ambient noise signal. The second FF microphone signal may be amplified by amplifier 252*b,* processed by ADC 254*b,* and downsampled by downsample filter 256*b* to generate a second noise FF signal.

When both FF filter 258*a* and FF filter 258*b* are already tuned for the ANC function, a first FF-filtered noise signal generated by FF filter 258*a* based on the first noise FF signal and a second. FF-filtered noise signal generated by FF filter 258*b* based on the second noise FF signal may be integrated into a combined noise signal through adder 282. For example, the combined noise signal may be an average or a sum of the first and second FF-filtered noise signals. Then, limiter 209 may process the combined noise signal correspondingly.

In some implementations, when (a) the FF loop and the FB loop are activated for the ANC function and (b) both FF filters 258*a* and 258*b* are already tuned, a music signal from audio source 210 (which is to be played by speaker 104) may be added with the combined noise signal from the FF loop and the FB-filtered signal from the FB loop to generate a noise and music combined signal through adder 212. The FB-filtered signal from the FB loop can be generated as follows: (1) echo-cancel filter 216 may be activated and configured to subtract the music FB microphone signal included in the FB microphone signal based on the music signal from audio source 210, with an output signal from echo-cancel filter 216 to be subtracted from the down-sampled FB signal through subtracter 226 to generate an echo-cancelled audio signal; (2) the echo-cancelled audio signal may be processed by FB filter 228 to generate the FB-filtered signal. The noise and music combined signal may be processed by DAC 214 and then played by speaker 104, so that an ANC effect can be improved in the headphone. Therefore, the listening experience of the headphone can be enhanced.

Figure 2D:
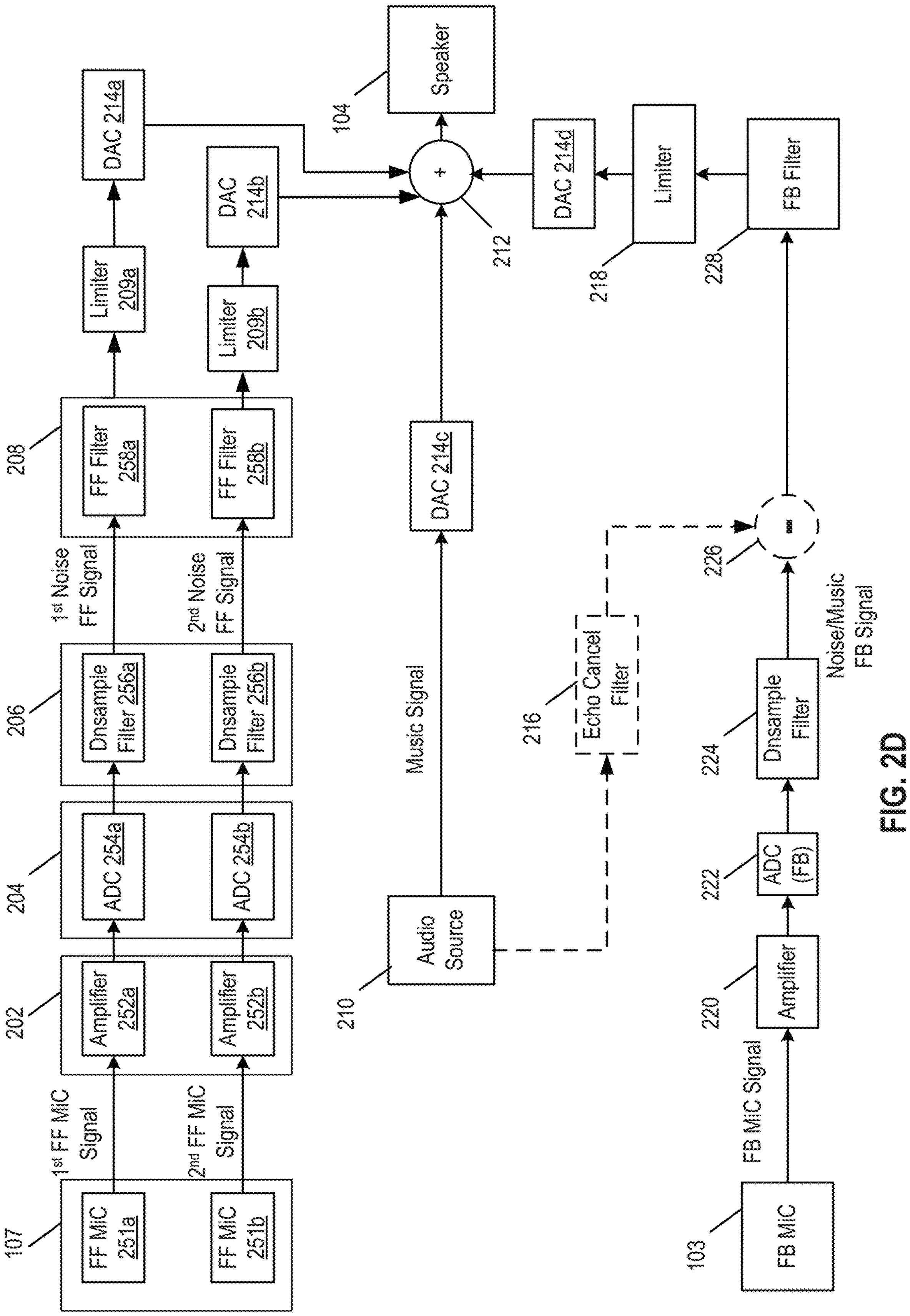

Referring to FIG. 2D, a headphone of FIG. 2D may have components like those in any of FIGS. 1 and 2A-2C, and the similar description will not be repeated herein. Compared with the headphone of FIG. 2C which includes a single limiter 209 and a single DAC 214, the headphone of FIG. 2D may include a plurality of DACs 214 (e.g., 214*a*, 214*b*, 214*c*, and 214*d*) and a plurality of limiters 209 (e.g., 209*a* and 209*b*). For example, the first FF path in the FF loop may include limiter 209*a* and DAC 214*a* after FF filter 258*a*. The second FF path in the FF loop may include limiter 209*b* and DAC 214*b* after FF filter 258*b*. DAC 214*c* may be added between audio source 210 and adder 212. DAC 214*d* may be added between limiter 218 and adder 212. The operations of the headphone in FIG. 2D are like those of any of FIGS. 1 and 2A-2C, and the similar description will not be repeated herein.

Figure 3A:
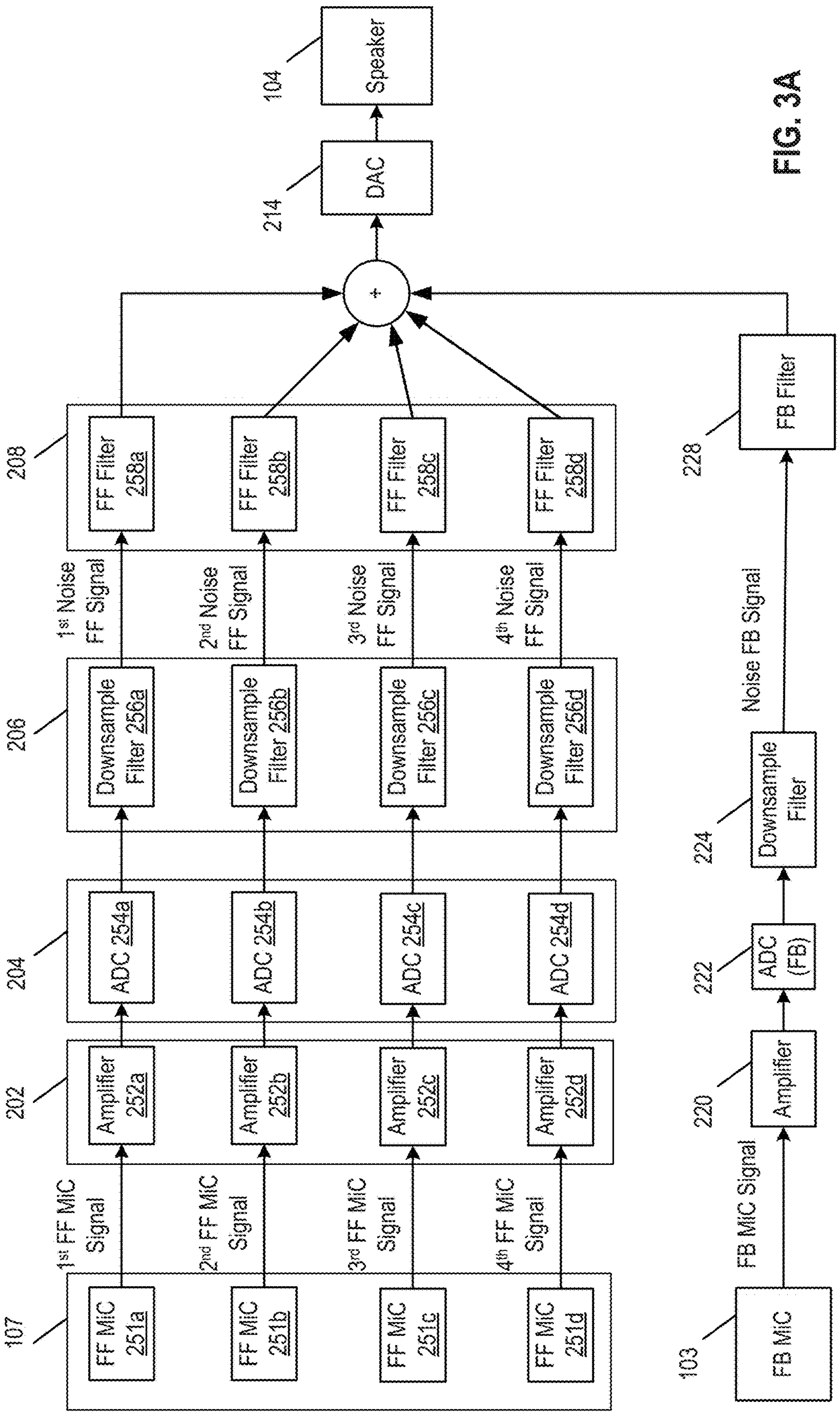
FIGS. 3A-3B illustrates block diagrams of exemplary implementations of a headphone that includes four FF paths in an FF loop, according to some aspects of the present disclosure.
Figure 3B:
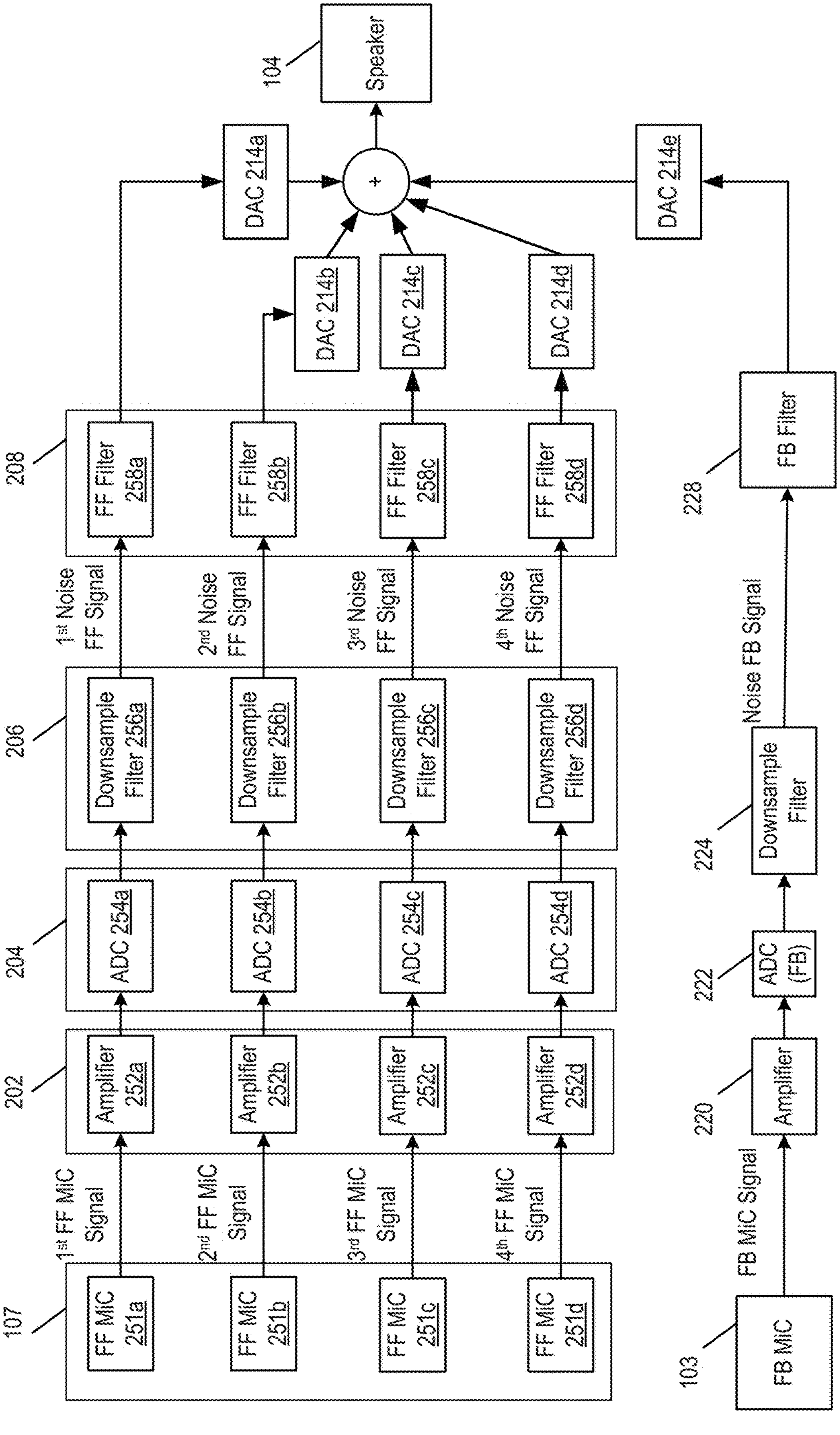

FIGS. 3A-3B illustrates block diagrams of exemplary implementations of a headphone that includes four FF paths in an FF loop, according to some aspects of the present disclosure. The headphone of FIG. 3A or 3B may have components like those in any of FIGS. 1 and 2A-2D, and the similar description will not be repeated herein.

Referring to FIG. 3A, FF microphone set 107 may include FF microphones 251*a*, 251*b*, 251*c*, and 251*d* located in different positions on the outside of the headphone; amplifier set 202 may include amplifiers 252*a*, 252*b*, 252*c*, and 252*d*; ADC set 204 may include ADCs 254*a*, 254*b*, 254*c*, and 254*d*; downsample filter set 206 may include downsample filters 256*a*, 256*b*, 256*c*, and 256*d*; and FF filter set 208 may include FF filters 258*a*, 258*b*, 258*c*, and 258*d*. That is, a first FF path may include FF microphone 251*a*, amplifier 252*a*, ADC 254*a*, downsample filter 256*a*, and FF filter 258*a*. A second FF path may include FF microphone 251*b*, amplifier 252*b*, ADC 254*b*, downsample filter 256*b*, and FF filter 258*b*. A third FF path may include FF microphone 251*c*, amplifier 252*c*, ADC 254*c*, downsample filter 256*c*, and FF filter 258*c*. A fourth FF path may include FF microphone 251*d*, amplifier 252*d*, ADC 254*d*, downsample filter 256*d*, and FF filter 258*d*.

In the first FF path, a first FF microphone signal may be obtained by FF microphone 251*a* based on an ambient noise signal when the headphone is worn by the user. The first FF microphone signal may be amplified by amplifier 252*a*, processed by ADC 254*a*, and downsampled by downsample filter 256*a* to generate a first noise FF signal. Similarly, in the second FF path, a second FF microphone signal may be obtained by FF microphone 251*b* based on the ambient noise signal, processed by ADC 254*b*, and downsampled by downsample filter 256*b* to generate a second noise FF signal. In the third FF path, a third FF microphone signal may be obtained by FF microphone 251*c* based on the ambient noise signal, processed by ADC 254*c*, and downsampled by downsample filter 256*c* to generate a third noise FF signal. In the fourth FF path, a fourth FF microphone signal may be obtained by FF microphone 251*d* based on the ambient noise signal, processed by ADC 254*d*, and downsampled by downsample filter 256*d* to generate a fourth noise FF signal.

FF filters 258*a*-258*d* may be tuned sequentially, and a set of leakage monitoring parameters may be determined sequentially based on the sequential tuning of the set of FF filters. A set of FF filter parameters for FF filters 258*a*-258*d* may be adjusted sequentially based on the sequential determination of the set of leakage monitoring parameters. When all of FF filters 258*a*-258*d* are already tuned, FF filter 258*a* may be configured to generate a first FF-filtered noise signal based on the first noise FF signal from downsample filter 256*a*; FF filter 258*b* may be configured to generate a second FF-filtered noise signal based on the second noise FF signal from downsample filter 256*b*; FF filter 258*c* may be configured to generate a third FF-filtered noise signal based on the third noise FF signal from downsample filter 256*c*; and FF filter 258*d* may be configured to generate a fourth FF-filtered noise signal based on the fourth noise FF signal from downsample filter 256*d*. The first, second, third, and fourth FF-filtered noise signals may be integrated into a combined noise signal.

For example, the combined noise signal may be an average of the first, second, third, and fourth FF-filtered noise signals. In another example, since the sequential tuning and adjustment of FF filters 258*a*-258*d* takes into account the overall noise reduction effect, the combined noise signal can be a sum of the first, second, third, and fourth FF-filtered noise signals (rather than an average of the first, second, third, and fourth FF-filtered noise signals).

Subsequently, the headphone of FIG. 3A may perform operations like those of any of FIGS. 1 and 2A-2D to implement the ANC function disclosed herein, and the similar description will not be repeated herein.

Compared with the headphone of FIG. 3A, which includes DAC 214 preceding to speaker 104, the headphone of FIG. 3B may include a plurality of DACs 214*a*, 214*b*, 214*c*, 214*d*, and 214*e*. For example, the first FF path in the FF loop may include DAC 214*a* after FF filter 258*a*. The second FF path in the FF loop may include DAC 214*b* after FF filter 258*b*. The third FF path in the FF loop may include DAC 214*c* after FF filter 258*c*. The fourth FF path in the FF loop may include DAC 214*d* after FF filter 258*d*. DAC 214*e* may be added between limiter 218 and adder 212. The operations of the headphone in FIG. 3B are like those of any of FIGS. 1, 2A-2D, and 3A, and the similar description will not be repeated herein.

Figure 4A:
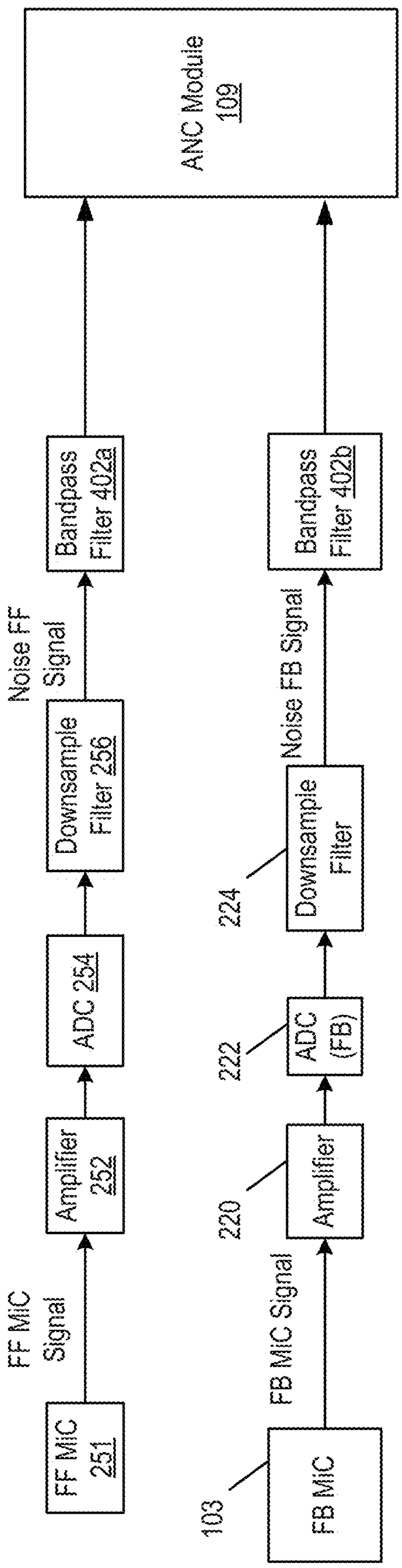
FIGS. 4A-4B illustrate block diagrams of an exemplary implementation of an ANC function in a headphone by utilizing an FF loop that includes an FF path, according to some aspects of the present disclosure.
Figure 4B:
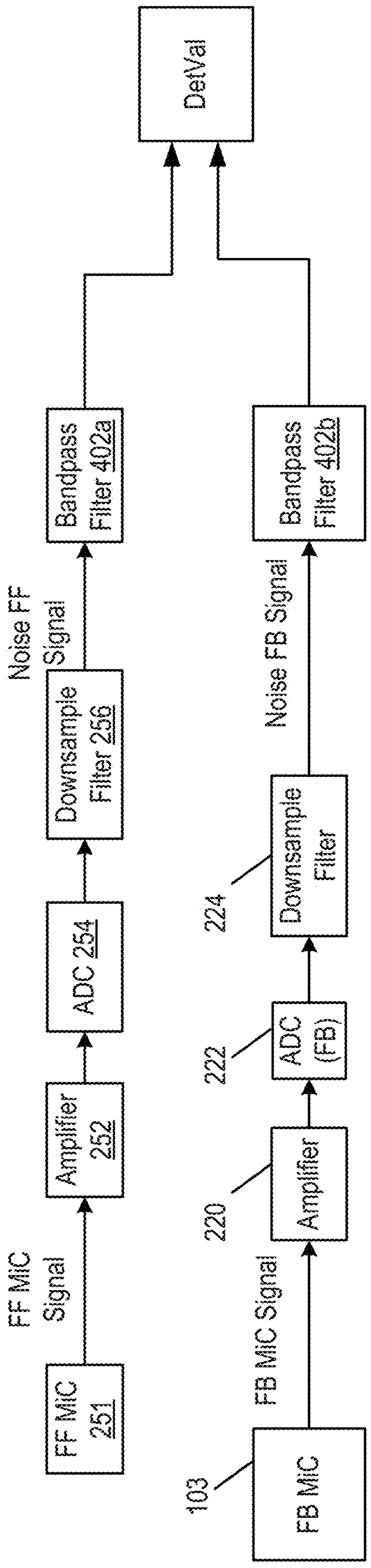

FIGS. 4A-4B illustrate block diagrams of an exemplary implementation of an ANC function in a headphone by utilizing an FF loop that includes an FF path, according to some aspects of the present disclosure. The headphone may additionally include bandpass filters 402*a* and 402*b*. FIGS. 4A-4B are described together herein with reference to FIG. 2B.

With reference to FIG. 2B, an FF microphone signal may be obtained by FF microphone 251*a* based on an ambient noise signal. The FF microphone signal may be amplified by amplifier 252*a*, processed by ADC 254*a*, and downsampled by downsample filter 256*a* to generate a noise FF signal. When FF filter 258 is tuned, the noise FF signal may be filtered by FF filter 258 to generate an FF-filtered noise signal. When no music signal is played, the FF filtered noise signal may be processed by limiter 209 and DAC 214, and played by speaker 104. Responsive to the FF-filtered noise signal being played by speaker 104, an FB microphone signal can be acquired by FB microphone 103. The FB microphone signal may be processed by amplifier 220, ADC 222, and downsample filter 224 to generate a noise FB signal. ANC module 109 may determine a leakage monitoring parameter based on the noise FF signal and the noise FB signal.

For example, referring back to FIGS. 4A and 4B, the noise FF signal in the FF path may be filtered using bandpass filter 402*a* to generate a bandpass-filtered noise FF signal in a frequency band of interest. The noise FB signal in the FB loop may also be filtered using bandpass filter 402*b* to generate a bandpass-filtered noise FB signal in the frequency band of interest. ANC module 109 may generate a leakage monitoring parameter (denoted as DetVal) based on the bandpass-filtered noise FF signal and the bandpass-filtered noise FB signal. For example, the leakage monitoring parameter (DetVal) may be determined using the following equation (1):

$$DetVal = \frac{\sum \text{Noise\_data}_i * \text{Error\_data}_i}{\sum \text{Noise\_data}_i * \text{Noise\_data}_i}. \quad (1)$$

In the above equation (1), $\text{Noise\_data}_i$ denotes the bandpass-filtered noise FF signal at an $i^{th}$ sampling time ($1 \le i \le I$), where I denotes a total number of sampling times. The summation operation in equation (1) is summing over the total number of sampling times. $\text{Error\_data}_i$ denotes the bandpass-filtered noise FB signal at the $i^{th}$ sampling time. * denotes a multiplication operation.

When the leakage monitoring parameter (DetVal) has a positive value, it indicates that a gain of FF filter 258 is relatively large (e.g., exceeding an expected gain). A larger absolute value of DetVal may indicate that the gain of FF filter 258 exceeds the expected gain more. When the leakage monitoring parameter (DetVal) has a negative value, it indicates that the gain of FF filter 258 is relatively small (e.g., below the expected gain). A larger absolute value of DetVal may indicate that the gain of FF filter 258 is below the expected gain more, and the gain of FF filter 258 needs to be compensated more. In some implementations, the leakage monitoring parameter (DetVal) may indicate a matching degree between a setting of FF filter 258 and a leakage condition of the headphone. If the matching degree between the setting of FF filter 258 and the leakage condition of the headphone is high, the leakage monitoring parameter (DetVal) may approach a zero value.

ANC module 109 may adjust an FF filter parameter of FF filter 258 based on the leakage monitoring parameter. For example, responsive to the leakage monitoring parameter being positive (e.g., having a positive value), ANC module 109 may reduce a gain of FF filter 258, reduce a gain of the FF path, or adjust another parameter of FF filter 258 to make the leakage monitoring parameter fall within a predetermined range. Responsive to the leakage monitoring parameter being negative (e.g., having a negative value), ANC module 109 may increase the gain of FF filter 258, increase the gain of the FF path, or adjust another parameter of FF filter 258 to make the leakage monitoring parameter fall within the predetermined range. The predetermined range for the leakage monitoring parameter can be in a range between $[-\alpha, \alpha]$, where $\alpha$ denotes a predetermined positive threshold. In some implementations, the adjustment of the gain of FF filter 258, the gain of the FF path, or another parameter of FF filter 258 can be performed gradually with a fixed step size in real time or near real time. In some implementations, if the leakage monitoring parameter already falls within the predetermined range, there is no need to adjust the gain or another FF filter parameter of FF filter 258.

Figure 4C:
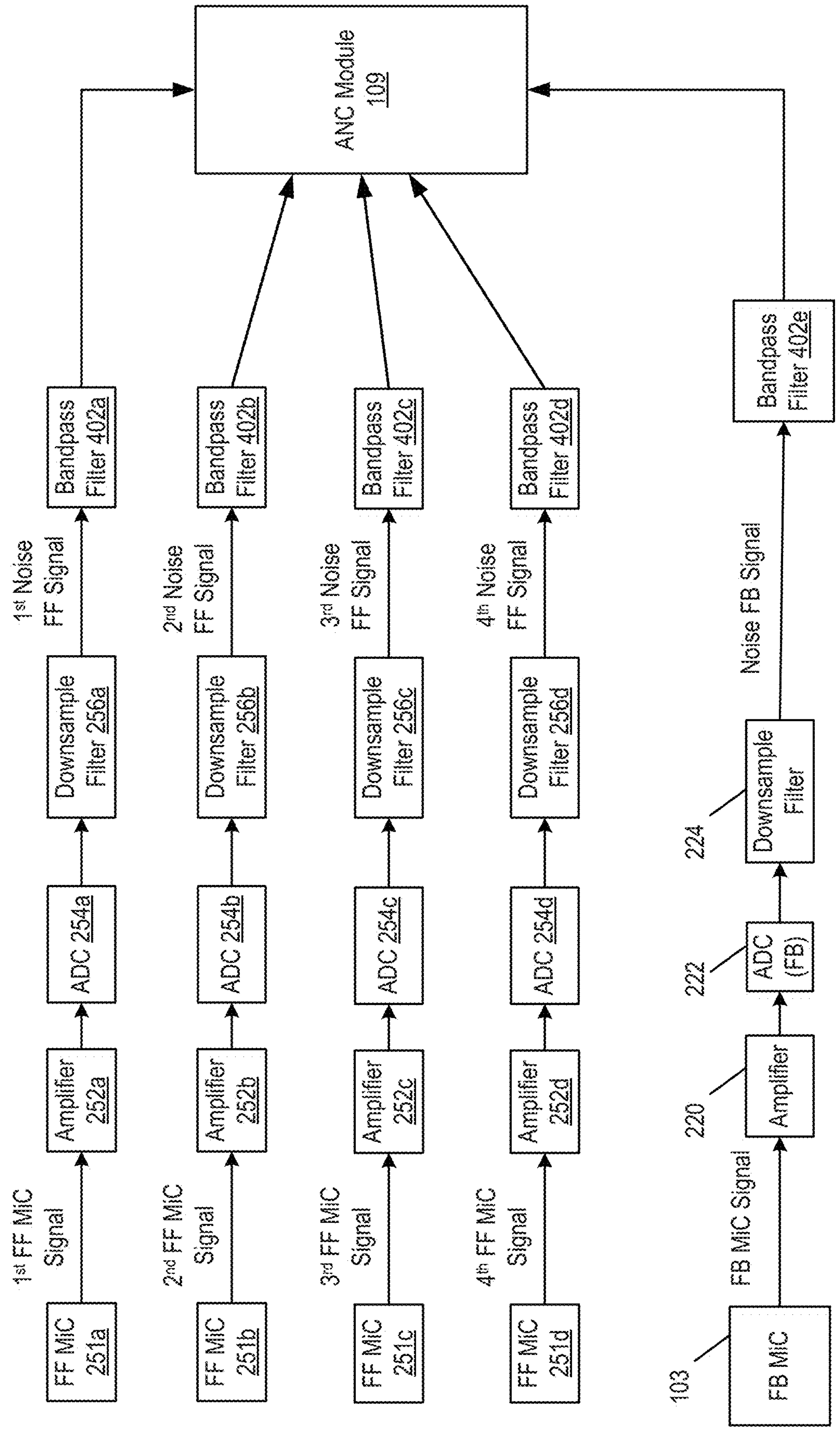
FIGS. 4C-4D illustrate block diagrams of another exemplary implementation of an ANC function in a headphone by utilizing an FF loop that includes four FF paths, according to some aspects of the present disclosure.
Figure 4D:
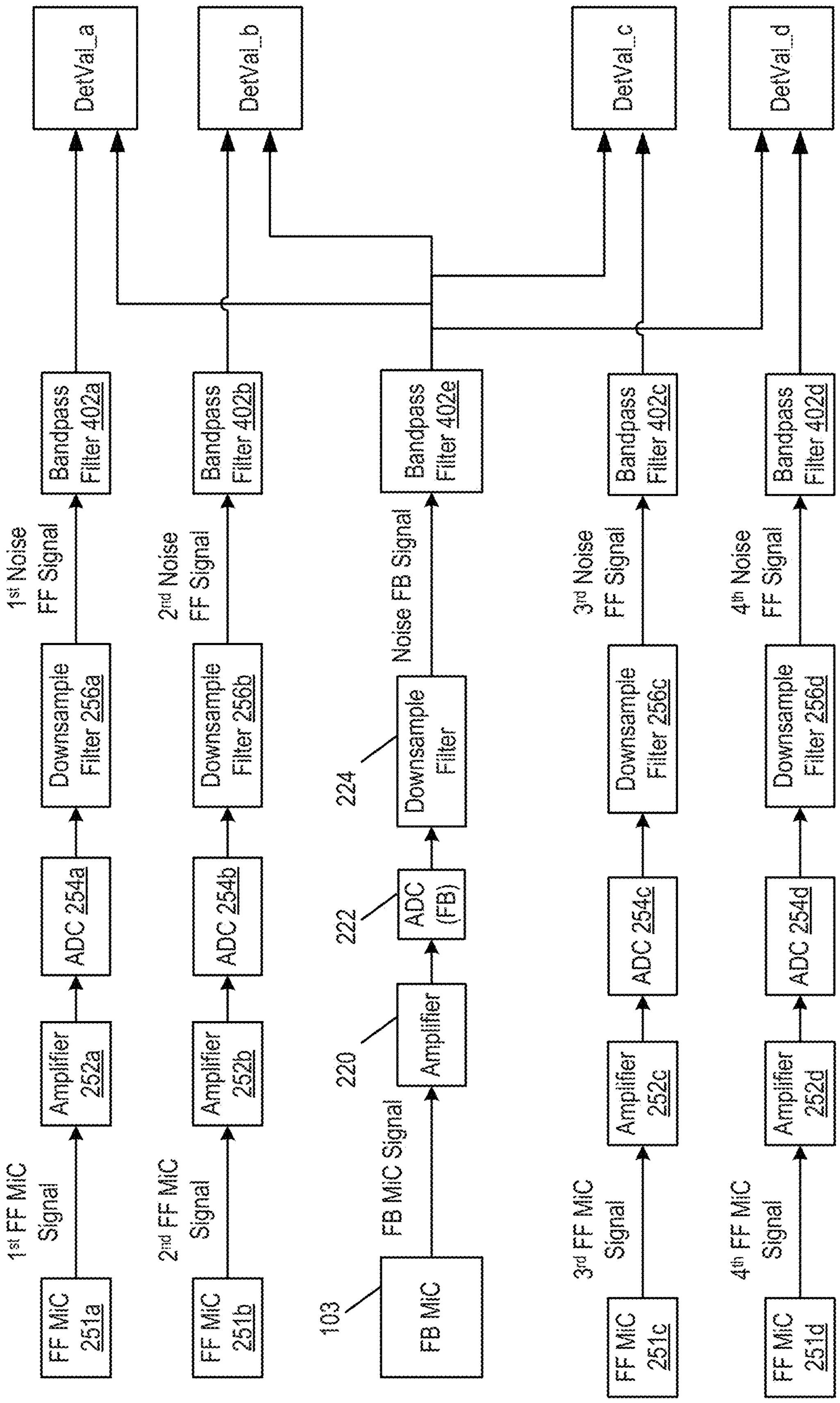

FIGS. 4C-4D illustrate block diagrams of another exemplary implementation of an ANC function in a headphone by utilizing an FF loop that includes four FF paths, according to some aspects of the present disclosure. The headphone may include passband filters 402*a*-402*d*. FIGS. 4C-4D are described together herein with reference to FIG. 3A. With reference to FIG. 3A, the four FF paths can be activated and adjusted for implementing the ANC function sequentially. For example, FF filters 258*a*-258*d* can be tuned sequentially. A set of leakage monitoring parameters can be determined for the set of FF filters 258*a*-258*d* sequentially based on the sequential tuning of FF filters 258*a*-258*d*. A set of FF filter parameters for FF filters 2528*a*-258*d* can be adjusted sequentially based on the sequential determination of the set of leakage monitoring parameters.

Specifically, with reference to FIG. 3A, ANC module 109 may firstly activate the first FF path and tune FF filter 258*a*. ANC module 109 may keep the remaining FF filters (e.g., FF filter 258*b*-258*d*) in their respective current states. A first noise FF signal may be generated through the first FF path, and filtered using FF filter 258*a* to generate a first FF-filtered noise signal. The first FF-filtered noise signal may be processed by DAC 214 and played by speaker 104. FB microphone 103 may acquire a first FB microphone signal responsive to the first FF-filtered noise signal being played by speaker 104. A noise FB signal may be generated from the first FB microphone signal. ANC module 109 may determine a first leakage monitoring parameter based on the first noise FF signal and the noise FB signal.

For example, referring back to FIGS. 4C and 4D, the first noise FF signal in the first FF path may be filtered using bandpass filter 402*a* to generate a first bandpass-filtered noise FF signal in a frequency band of interest. The noise FB signal in the FB loop may be filtered using bandpass filter 402*e* to generate a bandpass-filtered noise FB signal in the frequency band of interest. ANC module 109 may generate a first leakage monitoring parameter (denoted as DetVal_a) based on the first bandpass-filtered noise FF signal and the bandpass-filtered noise FB signal based on the above equation (1). ANC module 109 may adjust a first FF filter parameter of FF filter 258*a* based on the first leakage monitoring parameter by performing operations like those described above with reference to FIGS. 4A-4B. The similar description will not be repeated herein.

Next, with reference to FIG. 3A again, after the first FF filter parameter of FF filter 258*a* is adjusted based on the first leakage monitoring parameter, ANC module 109 may keep FF filter 258*a* in its tuned state, and tune FF filter 258*b* next.

ANC module 109 may keep FF filter 258*c*-258*d* in their respective current states, respectively. The first noise FF signal may be filtered using the tuned FF filter 258*a* to generate the first FF-filtered noise signal. A second noise FF signal may be generated through the second FF path, and filtered using FF filter 258*b* to generate a second FF-filtered noise signal. The first FF-filtered noise signal may be aggregated with the second FF-filtered noise signal to generate a combined noise signal. The combined noise signal may be processed by DAC 214 and played by speaker 104. FB microphone 103 may acquire the first FB microphone signal responsive to the combined noise signal being played by speaker 104. The noise FB signal may be generated from the first FB microphone signal. ANC module 109 may determine a second leakage monitoring parameter based on the second noise FF signal and the noise FB signal.

For example, referring back to FIGS. 4C and 4D, the second noise FF signal in the second FF path may be filtered using bandpass filter 402*b* to generate a second bandpass-filtered noise FF signal in the frequency band of interest. The noise FB signal in the FB loop may be filtered using bandpass filter 402*e* to generate the bandpass-filtered noise FB signal in the frequency band of interest. ANC module 109 may generate a second leakage monitoring parameter (denoted as DetVal_b) based on the second bandpass-filtered noise FF signal and the bandpass-filtered noise FB signal based on the above equation (1). ANC module 109 may adjust a second FF filter parameter of FF filter 258*b* based on the second leakage monitoring parameter by performing operations like those described above with reference to FIGS. 4A-4B.

Subsequently, with reference to FIG. 3A again, after the first FF filter parameter of FF filter 258*a* and the second FF filter parameter of FF filter 258*b* are adjusted based on the first and second leakage monitoring parameters, ANC module 109 may keep FF filters 258*a*-258*b* in their respective tuned states, and tune FF filter 258*c* next. ANC module 109 may keep FF filter 258*d* in its current state. The first noise FF signal may be filtered using the tuned FF filter 258*a* to generate the first FF-filtered noise signal. The second noise FF signal may be filtered using the tuned FF filter 258*b* to generate the second FF-filtered noise signal. A third noise FF signal may be generated through the third FF path, and filtered using FF filter 258*c* to generate a third FF-filtered noise signal. The first FF-filtered noise signal and the second FF-filtered noise signal can be aggregated with the third FF-filtered noise signal to generate a combined noise signal. The combined noise signal may be processed by DAC 214 and played by speaker 104. FB microphone 103 may acquire the first FB microphone signal responsive to the combined noise signal being played by speaker 104. The noise FB signal may be generated from the first FB microphone signal. ANC module 109 may determine a third leakage monitoring parameter based on the third noise FF signal and the noise FB signal.

For example, referring back to FIGS. 4C and 4D, the third noise FF signal in the third FF path may be filtered using bandpass filter 402*c* to generate a third bandpass-filtered noise FF signal in the frequency band of interest. The noise FB signal in the FB loop may be filtered using bandpass filter 402*e* to generate the bandpass-filtered noise FB signal in the frequency band of interest. ANC module 109 may generate a third leakage monitoring parameter (denoted as DetVal_c) based on the third bandpass-filtered noise FF signal and the bandpass-filtered noise FB signal based on the above equation (1). ANC module 109 may adjust a third FF filter parameter of FF filter 258*b* based on the second leakage monitoring parameter by performing operations like those described above with reference to FIGS. 4A-4B.

Further, with reference to FIG. 3A again, ANC module 109 may keep FF filters 258*a*-258*c* in their respective tuned states, and tune FF filter 258*d* next. For example, the first, second, and third noise FF signals may be filtered using the tuned FF filters 258*a*, 258*b*, and 258*c* to generate the first, second, and third FF-filtered noise signals, respectively. A fourth noise FF signal may be generated through the fourth FF path, and filtered using FF filter 258*d* to generate a fourth FF-filtered noise signal. The first, second, and third FF-filtered noise signals can be aggregated with the fourth FF-filtered noise signal to generate a combined noise signal. The combined noise signal may be processed by DAC 214 and played by speaker 104. FB microphone 103 may acquire the first FB microphone signal responsive to the combined noise signal being played by speaker 104. The noise FB signal may be generated from the first FB microphone signal. ANC module 109 may determine a fourth leakage monitoring parameter based on the third noise FF signal and the noise FB signal.

For example, referring back to FIGS. 4C and 4D, ANC module 109 may filter the fourth noise FF signal using bandpass filter 402*d* to generate a fourth bandpass-filtered noise FF signal in the frequency band of interest. The noise FB signal in the FB loop may be filtered using bandpass filter 402*e* to generate the bandpass-filtered noise FB signal in the frequency band of interest. ANC module 109 may generate a fourth leakage monitoring parameter (denoted as DetVal_d) based on the fourth bandpass-filtered noise FF signal and the bandpass-filtered noise FB signal based on the above equation (1). ANC module 109 may adjust a fourth FF filter parameter of FF filter 258*b* based on the fourth leakage monitoring parameter.

It is contemplated that in some implementations, the FF filters in the FF loop can also be tuned separately or individually (e.g., not sequentially). A noise signal generated by the filtering of the ambient noise signal through the FF filters and a part of the ambient noise signal that reaches inside the ear canal directly can cancel out with each other in the air, with a residual noise signal after the cancellation satisfies a predetermined condition. The FF filter parameters for respective FF filters can be adjusted under different wearing manners. Each FF filter can be separately adjusted with its corresponding FF microphone facing a different direction, so that a smooth noise reduction effect can be achieved. Since each FF filter is adjusted independently, an average processing can be performed on the FF-filtered noise signals (e.g., the combined noise signal being an average of the FF-filtered noise signals), so that an overall gain of the FF loop can be an average of the gains of the FF paths to avoid an over-large overall gain.

In some implementations, during the separate tuning (or individual tuning) of the FF filters, a transfer function of a transmission path from the outside of the headphone to the inside of the ear can be determined. The transfer function can be used to represent a noise-reduction residual signal output by the FF loop. Therefore, the FF filter parameters of the corresponding FF filters can be determined based on the transfer function.

Figure 5:
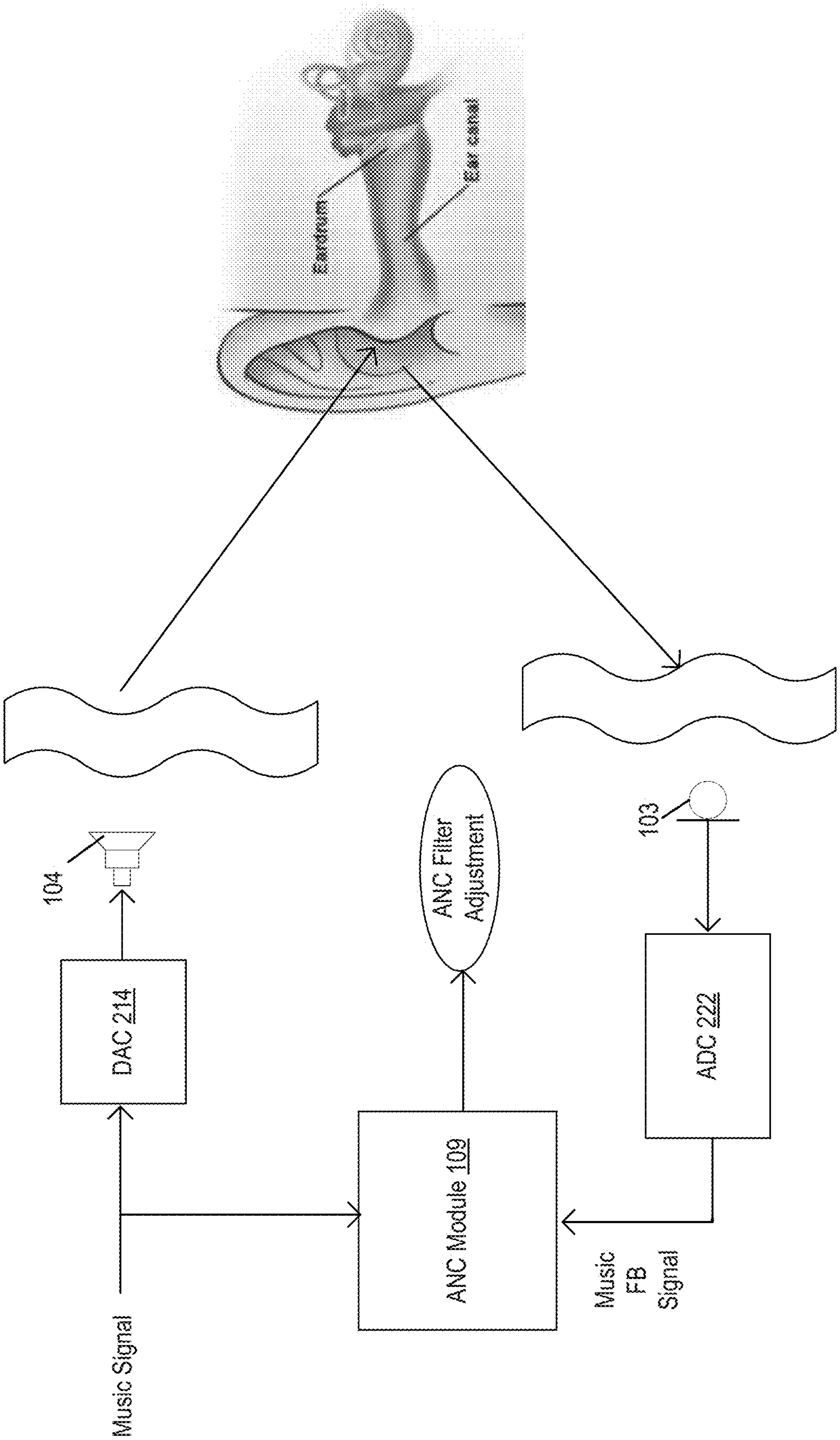
FIG. 5 illustrates a block diagram of yet another exemplary implementation of an ANC function in a headphone by utilizing a music signal played by the headphone and a music FB signal obtained from a FB loop, according to some aspects of the present disclosure.

FIG. 5 illustrates a block diagram of yet another exemplary implementation of an ANC function in a headphone by utilizing a music signal played by the headphone and a music FB signal obtained from a FB microphone input, according to some aspects of the present disclosure. Specifically, the music signal may be processed by DAC 214 and played by speaker 104. A second FB microphone signal may be acquired by FB microphone 103 responsive to the music signal being played by the speaker and processed by ADC 222 to generate a music FB signal based on the second FB microphone signal. ANC module 109 may determine a leakage condition parameter of the headphone based on the music signal and the music FB signal. ANC module 109 may adjust an FF filter parameter for at least one of a set of FF filters in the headphone to implement the ANC function based on the leakage condition parameter and a second predetermined matching relationship between a group of reference filter parameters and a group of reference leakage condition parameters.

Specifically, ANC module 109 may determine a frequency response of an acoustic path between speaker 104 and FB microphone 103 based on the music signal and the music FB signal. An exemplary method for determining the frequency response of the acoustic path is illustrated below with reference to FIG. 6. Exemplary frequency responses of the acoustic path are illustrated below with reference to FIG. 9. In the present disclosure, an amplitude-Frequency characteristic (e.g., an amplitude curve) of the acoustic path is used as an example of a frequency response of the acoustic path. It is contemplated that other characteristics of the acoustic path (e.g., a phase characteristic such as a phase curve) can be used as examples of the frequency response, which is not limited herein.

Next, ANC module 109 may determine a leakage condition parameter that matches the frequency response of the acoustic path based on a first predetermined matching relationship between a group of reference frequency responses of the acoustic path and a group of reference leakage condition parameters. The leakage condition parameter may indicate a leakage condition of the headphone (e.g., a slight leakage, a moderate leakage, or a severe leakage, etc.). For example, ANC module 109 may determine, from the group of reference frequency responses, a reference frequency response that matches the frequency response. The reference frequency response matches the frequency response if a maximum difference between the reference frequency response and the frequency response is not greater than a predetermined matching threshold. Then, ANC module 109 may determine, from the group of reference leakage condition parameters, a reference leakage condition parameter corresponding to the reference frequency response to be the leakage condition parameter.

In some implementations, the first predetermined matching relationship between the group of reference frequency responses of the acoustic path and the group of reference leakage condition parameters may be determined during the design phase of the headphone with respect to different leakage conditions of the headphone. For example, each reference frequency response of the acoustic path may correspond to a leakage condition of the headphone, which can be described by a corresponding reference leakage condition parameter. In this case, a matching relationship between each reference frequency response and a corresponding reference leakage condition parameter can be established.

For example, the correspondence between each reference frequency response and the leakage condition (or the corresponding reference leakage condition parameter) of the headphone may be pre-measured or predetermined in the design phase in various usage scenarios corresponding to various leakage conditions of the headphone. The various usage scenarios may be determined by different wearing manners and different ear canal structures of the users (or artificial ears). For example, different wearing manners (such as different wearing tightness, different wearing directions, etc.) and different ear canal structures (such as different ear canal lengths, different ear canal widths, etc.) may have different impacts on the leakage of headphone, which correspond to different usage scenarios of the headphone.

Subsequently, ANC module 109 may adjust an FF filter parameter for at least one of the FF filters based on the leakage condition parameter and a second predetermined matching relationship between a group of reference filter parameters and a group of reference leakage condition parameters. For example, ANC module 109 may determine the leakage condition parameter to be a reference leakage condition parameter corresponding to the reference frequency response that matches the frequency response of the headphone. Then, ANC module 109 may determine, from the group of reference filter parameters, a reference filter parameter that corresponds to the reference leakage condition parameter based on the second predetermined matching relationship between the group of reference filter parameters and the group of reference leakage condition parameters. ANC module 109 may determine an FF filter parameter for at least an FF filter from the set of FF filters based on the reference filter parameter. For example, the FF filter parameter may be configured to be the reference filter parameter.

In some implementations, the correspondence between each reference filter parameter and a corresponding reference leakage condition parameter of the headphone may be pre-measured or predetermined in the design phase in various usage scenarios corresponding to various leakage conditions of the headphone. For example, in the design phase, different reference filter parameters of the FF filter can be determined under different usage scenarios of the headphone (such as the headphone being worn very loosely, loosely, tightly, or very tightly, etc.), which correspond to different leakage conditions of the headphone. For each of the reference leakage conditions, a filter parameter for the FF filter can be updated automatically or manually until ambient noise cancellation achieves a satisfactory ANC effect (e.g., until a tuner of the headphone determines that the reverse ambient noise played by speaker 104 achieves a satisfactory ambient noise cancellation experience). In this case, the updated filter parameter that achieves the satisfactory ANC effect can be determined to be a reference filter parameter for the reference leakage condition. Thus, by performing similar operations for the group of reference leakage condition parameters, a group of reference filter parameters can be determined for the group of reference leakage condition parameters, respectively, so that a matching relationship between the group of reference filter parameters and the group of reference leakage condition parameters is established.

Consistent with the present disclosure, by determining the leakage condition parameter and adjusting a setting of at least one of the FF filters based on the leakage condition parameter, an improved ANC function can be achieved. For example, even if the wearing manner of the headphone is not changed by the user (e.g., a leakage condition of the headphone is unchanged), an ANC effect of the headphone can be improved by changing the setting of at least one of the FF filters.

Figure 6:
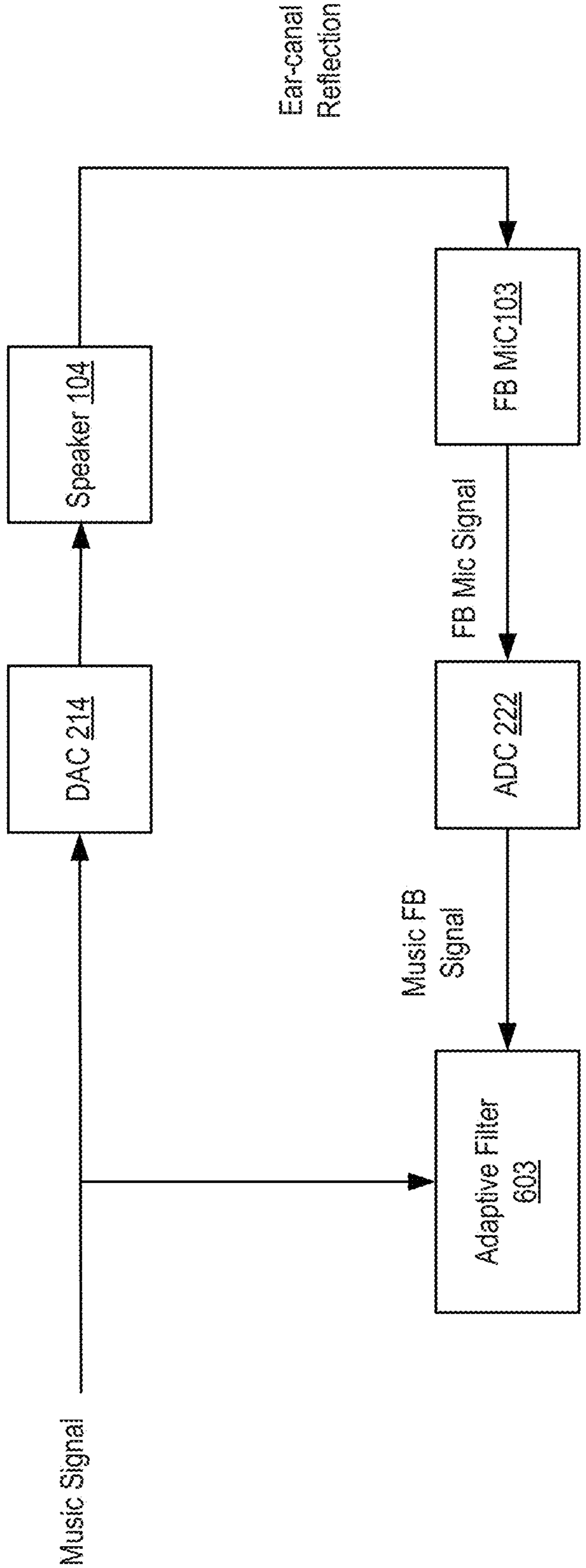
FIG. 6 illustrates an exemplary frequency response calculation method of an acoustic path from a speaker of a headphone to a microphone of the headphone using a music signal and a music feedback signal, according to some aspects of the present disclosure.

FIG. 6 illustrates an exemplary frequency response calculation method of an acoustic path from a speaker (e.g., speaker 104) of a headphone to a FB microphone (e.g., FB microphone 103) of the headphone using a music signal and a music FB signal, according to some aspects of the present disclosure. In some implementations, the music signal can be fed to an adaptive filter 603. The music signal may also be processed by DAC 214 and played by speaker 104 to generate an acoustic signal. Through the ear-canal reflection, FB microphone 103 may capture at least part of the acoustic signal and generate a FB microphone signal. The FB microphone signal may be processed by ADC 222 or any other suitable components disclosed herein to generate a music FB signal. The music FB signal can be fed to adaptive filter 603.

Filter coefficients of adaptive filter 603 can be obtained through an adaptive adjustment based on the music signal and the music FB signal and can be transformed into a frequency domain (e.g., using a fast Fourier transform (FFT)), so that a frequency response (e.g., an amplitude frequency response) of adaptive filter 603 can be obtained as the frequency response of the acoustic path from speaker 104 to FB microphone 103.

Figure 7:
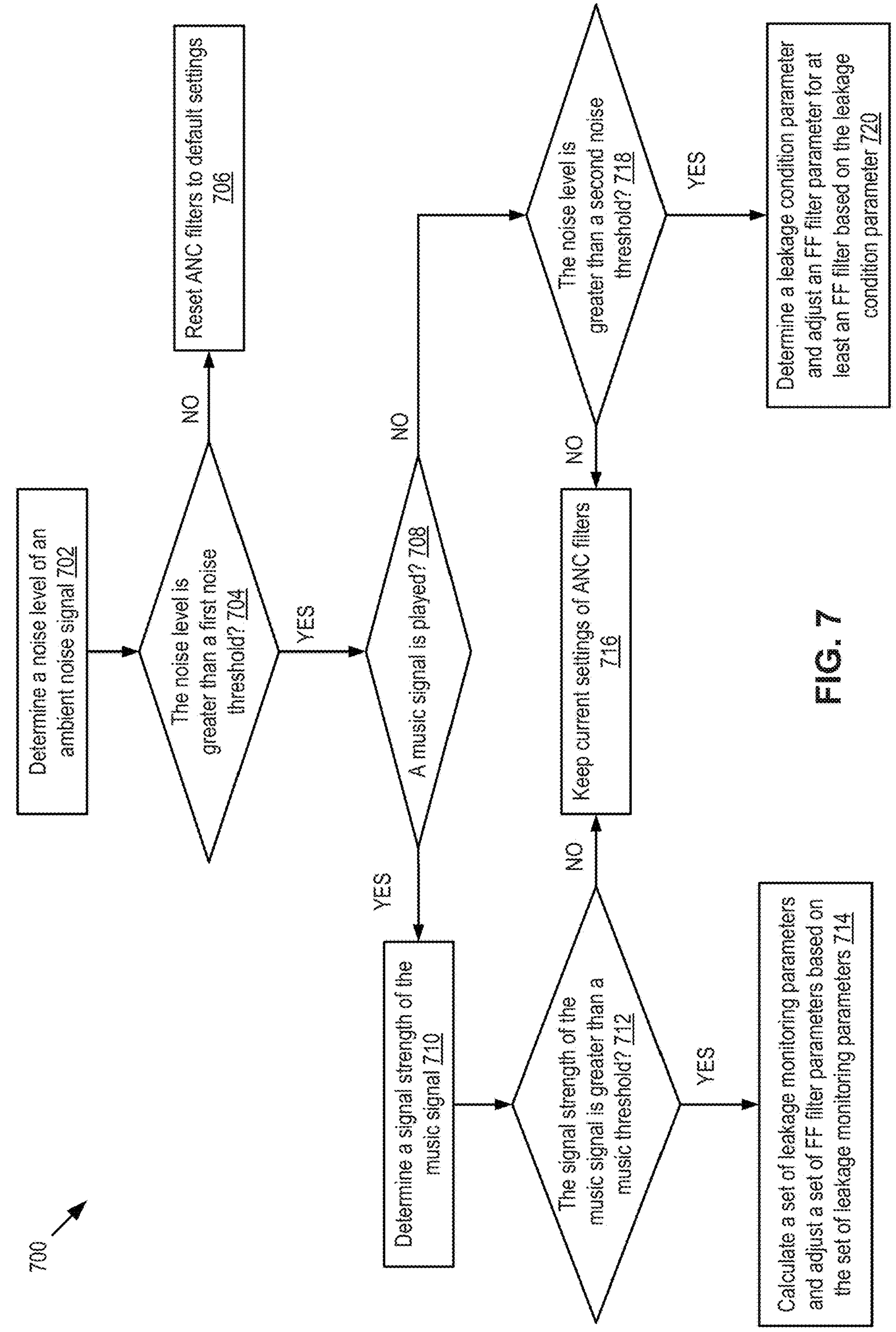
FIG. 7 illustrates an exemplary active ANC process for a headphone, according to some aspects of the present disclosure.

FIG. 7 illustrates an exemplary active ANC process 700 for a headphone, according to some aspects of the present disclosure. Process 700 may be implemented by processor 102 (e.g., ANC module 109 of processor 102) or any other suitable component of the headphone. It is understood that the operations shown in process 700 may not be exhaustive and that other operations can be performed as well before, after, or between any of the illustrated operations. Further, some of the operations may be performed simultaneously, or in a different order than shown in FIG. 7.

At operation 702, ANC module 109 may determine a noise level of an ambient noise signal.

At operation 704, ANC module 109 may determine whether the noise level of the ambient noise signal is greater than a first noise threshold. Responsive to the noise level of the ambient noise signal being greater than the first noise threshold, process 700 may proceed to operation 708. Otherwise, process 700 may proceed to operation 706.

At operation 706, ANC module 109 may reset ANC filters to default settings. For example, ANC module 109 may reset a set of FF filters in the headphone to a set of default settings, respectively.

At operation 708, ANC module 109 may determine whether a music signal is played by a speaker of the headphone. Responsive to the music signal being played, process 700 may proceed to operation 710. Otherwise, process 700 may proceed to operation 718.

At operation 710, ANC module 109 may determine a signal strength of the music signal in a frequency band of interest.

At operation 712, ANC module 109 may determine whether the signal strength of the music signal in the frequency band of interest is greater than a music threshold. Responsive to the signal strength of the music signal in the frequency band of interest being greater than the music threshold, process 700 may proceed to operation 714. Otherwise, process 700 may proceed to operation 716.

At operation 714, ANC module 109 may calculate a set of leakage monitoring parameters for the set of FF filters and adjust a set of FF filter parameters for the set of FF filters based on the set of leakage monitoring parameters. For example, ANC module 109 may perform operations like those described above with reference to FIGS. 4A-4D to calculate the set of leakage monitoring parameters and adjust the set of FF filter parameters for the set of FF filters based on the set of leakage monitoring parameters.

At operation 716, ANC module 109 may keep current settings of the ANC filters. For example, ANC module 109 may keep current settings of the set of FF filters. In some implementations, ANC module 109 may reset the set of FF filters to a set of default settings, respectively.

At operation 718, ANC module 109 may determine whether the noise level of the ambient noise signal is greater than a second noise threshold. Responsive to the noise level of the ambient noise signal being greater than the second noise threshold, process 700 may proceed to operation 720. Otherwise, process 700 may return to operation 716. The second noise threshold may be equal to or greater than the first noise threshold.

At operation 720, ANC module 109 may determine a leakage condition parameter and adjust an FF filter parameter for at least an FF filter in the set of FF filters based on the leakage condition parameter. For example, ANC module 109 may perform operations like those described above with reference to FIGS. 5-6 to determine a leakage condition parameter and adjust an FF filter parameter for at least an FF filter in the set of FF filters based on the leakage condition parameter.

Figure 8A:
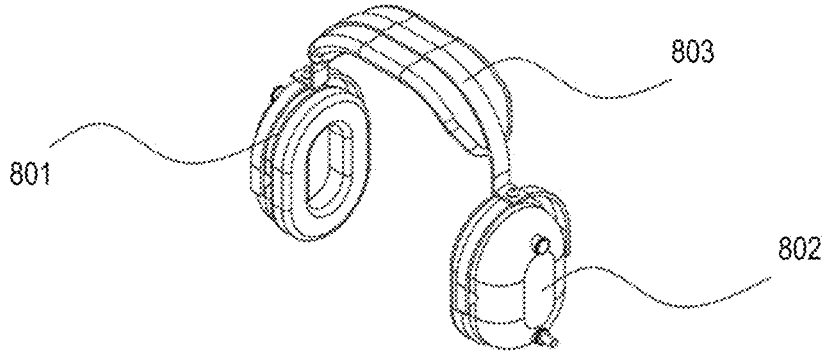
FIGS. 8A-8C are graphical representations illustrating exemplary structures of headphones with an ANC function, according to some aspects of the present disclosure.
Figure 8B:
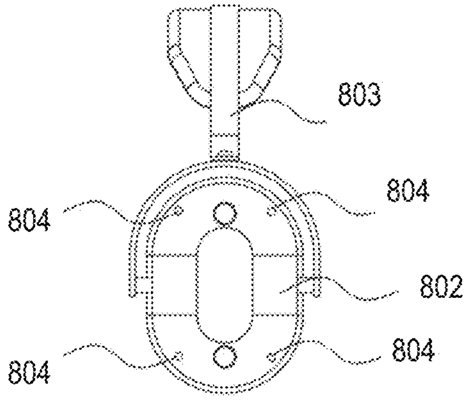
Figure 8C:
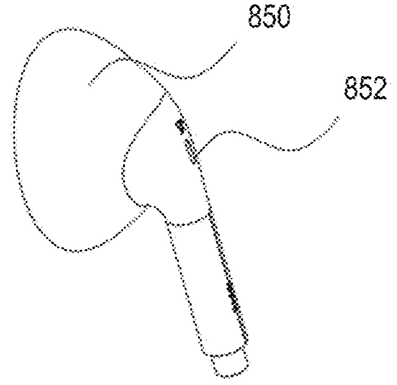

FIGS. 8A-8C are graphical representations illustrating exemplary structures of headphones with an ANC function, according to some aspects of the present disclosure. Referring to FIG. 8A, a schematic three-dimensional structure diagram of a headphone is shown. The headphone includes a body 801, two earmuffs 802, and a band 803. The earmuffs 802 are connected through band 803.

FIG. 8B shows a side view of the headphone of FIG. 8A. Multiple FF microphones 804 are installed in each earmuff 802. In some implementations, FF microphones 804 in each earmuff 802 are arranged in an array (e.g., a uniform array). Because the headphone with two earmuffs 802 has a relatively large space for installing FF microphones 804, a total number of FF microphones included in the array can be flexibly selected. For example, the array may include 3, 4, 8, or any suitable number of FF microphones. As shown in FIG. 8B, 4 FF microphones 804 are arranged at four corners of each earmuff 802. In this way, an ambient noise signal can be collected in multiple directions by FF microphones 804.

Consistent with the present disclosure, FF loops (including FF microphones and FF filters) of a headphone can be configured according to a type of the headphone. For example, a total number of the FF microphones can be different for different types of headphones. In another example, the FF microphones may be configured at different locations for the different headphones. In yet another example, a voice microphone (e.g., a microphone used for capturing a user's voice) installed in a headphone (e.g., a semi-in-ear headphone, or an in-ear headphone) can be reused as an FF microphone when the headphone has a relatively small size.

Referring to FIG. 8C, a schematic three-dimensional structure diagram of a semi-in-ear headphone is shown. The semi-in-ear headphone includes a casing 850 and an FF microphone 852. Since the size of the headphone is relatively small, only a single FF microphone 852 is installed on the outside of the headphone to form a first FF path. Meanwhile, a voice microphone of the headphone can be reconfigured as another FF microphone to form a second FF path. It is noted that the voice microphone is configured to act as an FF microphone to capture the ambient noise signal under the premise that its original call function is not affected. Thus, the active noise reduction effect can be achieved in the headphone, and the user's listening experience of the headphone can be improved while the original call function of the headphone remains unchanged.

Figure 9:
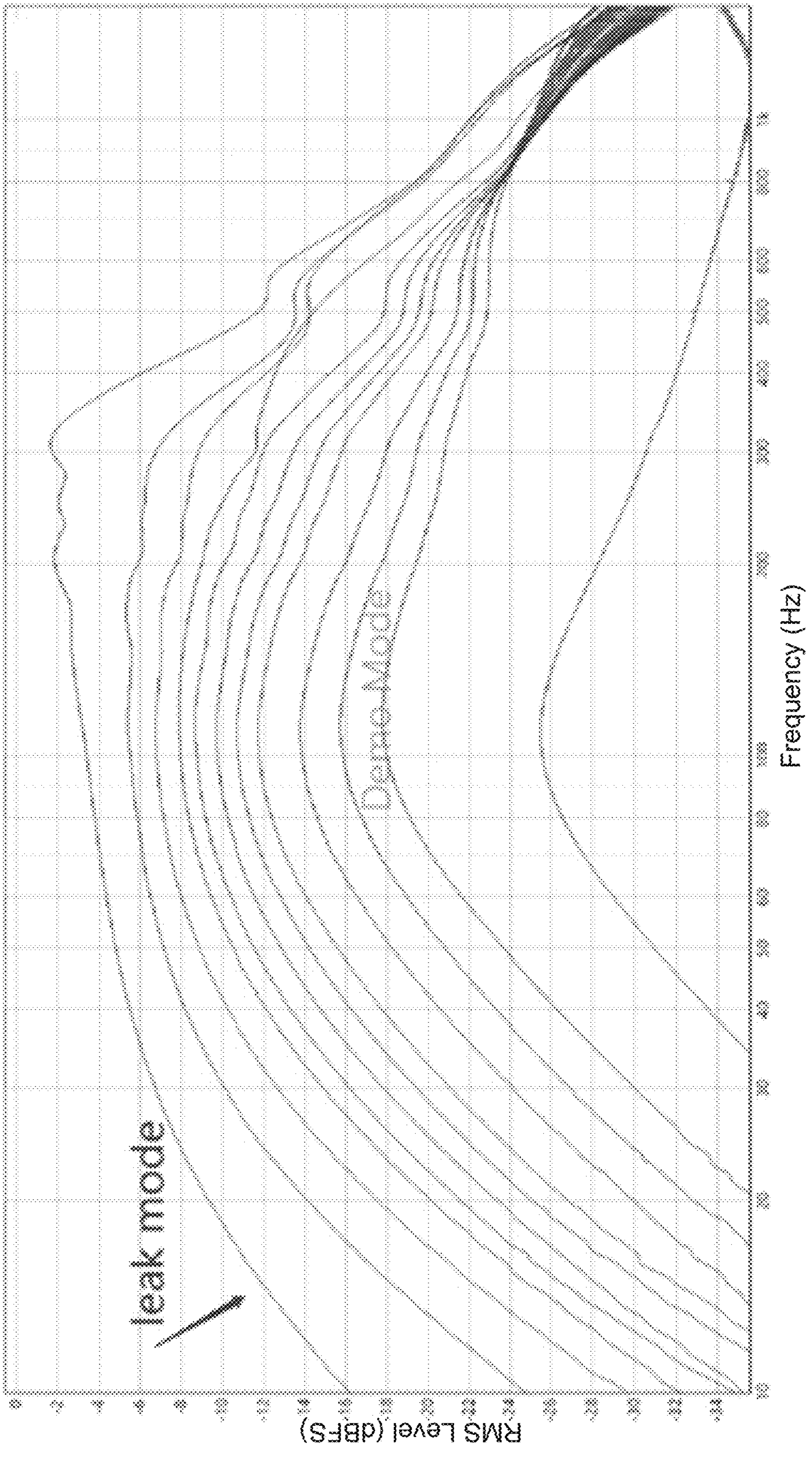
FIG. 9 is a graphical representation illustrating exemplary frequency response curves of a headphone, according to some aspects of the present disclosure.

FIG. 9 is a graphical representation illustrating exemplary frequency response curves of an acoustic path from a speaker (e.g., speaker 104) of a headphone to a microphone (e.g., FB microphone 103) of the headphone, according to some aspects of the present disclosure. Different frequency response curves in FIG. 9 may correspond to different leakage conditions (e.g., different leakage condition parameters) of the headphone which can be caused by different wearing tightness of the headphone. In some implementations, the frequency response curves of FIG. 9 can be used as a group of reference frequency responses for the headphone.

Figure 10:
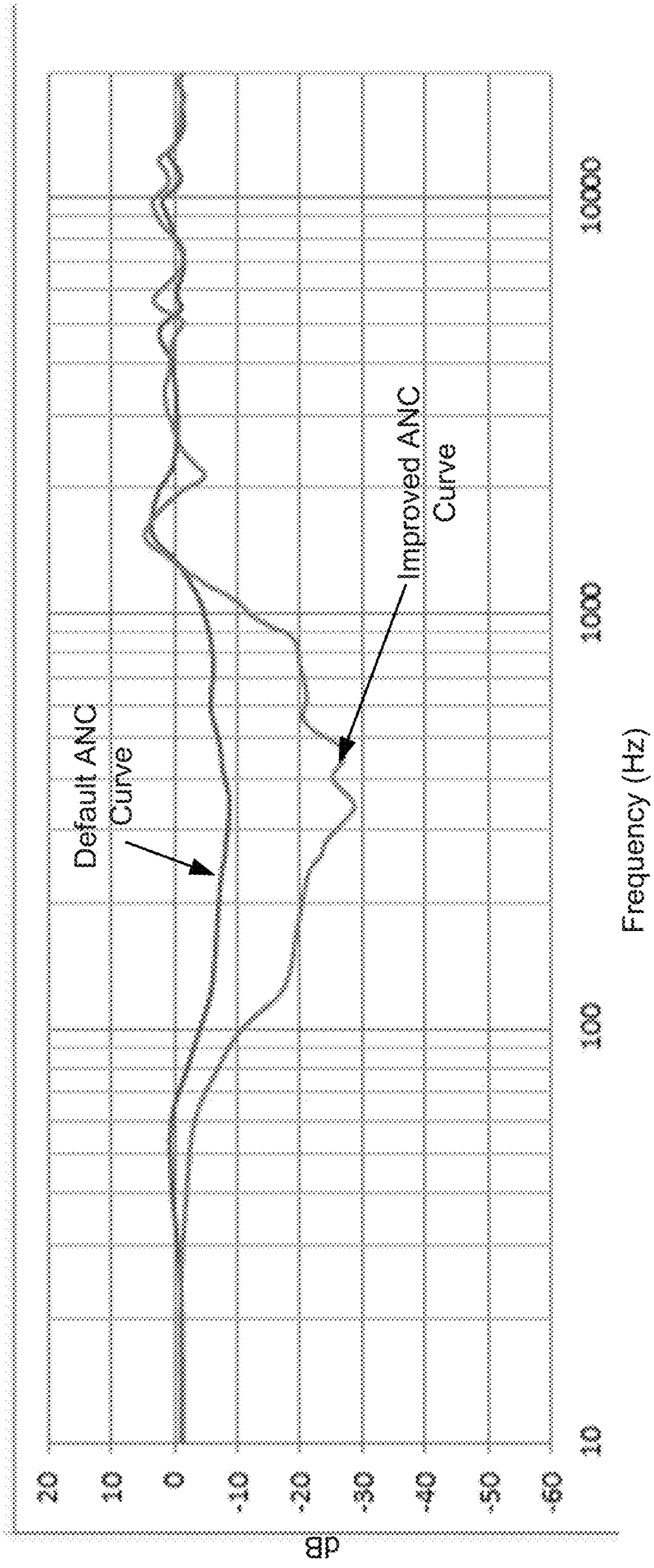
FIG. 10 is a graphical representation illustrating exemplary performance of a headphone when an ANC function disclosed herein is applied, according to some aspects of the present disclosure.

FIG. 10 is a graphical representation illustrating exemplary performance of a headphone when an ANC function disclosed herein is applied, according to some aspects of the present disclosure. FIG. 10 shows a default ANC curve where a default ANC method is applied, and an improved ANC curve where the ANC function disclosed herein is applied, when a leakage amount is set to be −15 dB. Compared with the default ANC curve, the noise reduction effect of the improved ANC curve is enhanced. For example, the noise reduction around 350 Hz is improved by about 20 dB by the improved ANC curve when compared with the default ANC curve. The user's listening experience with the headphone can be improved greatly.

Figure 11A:
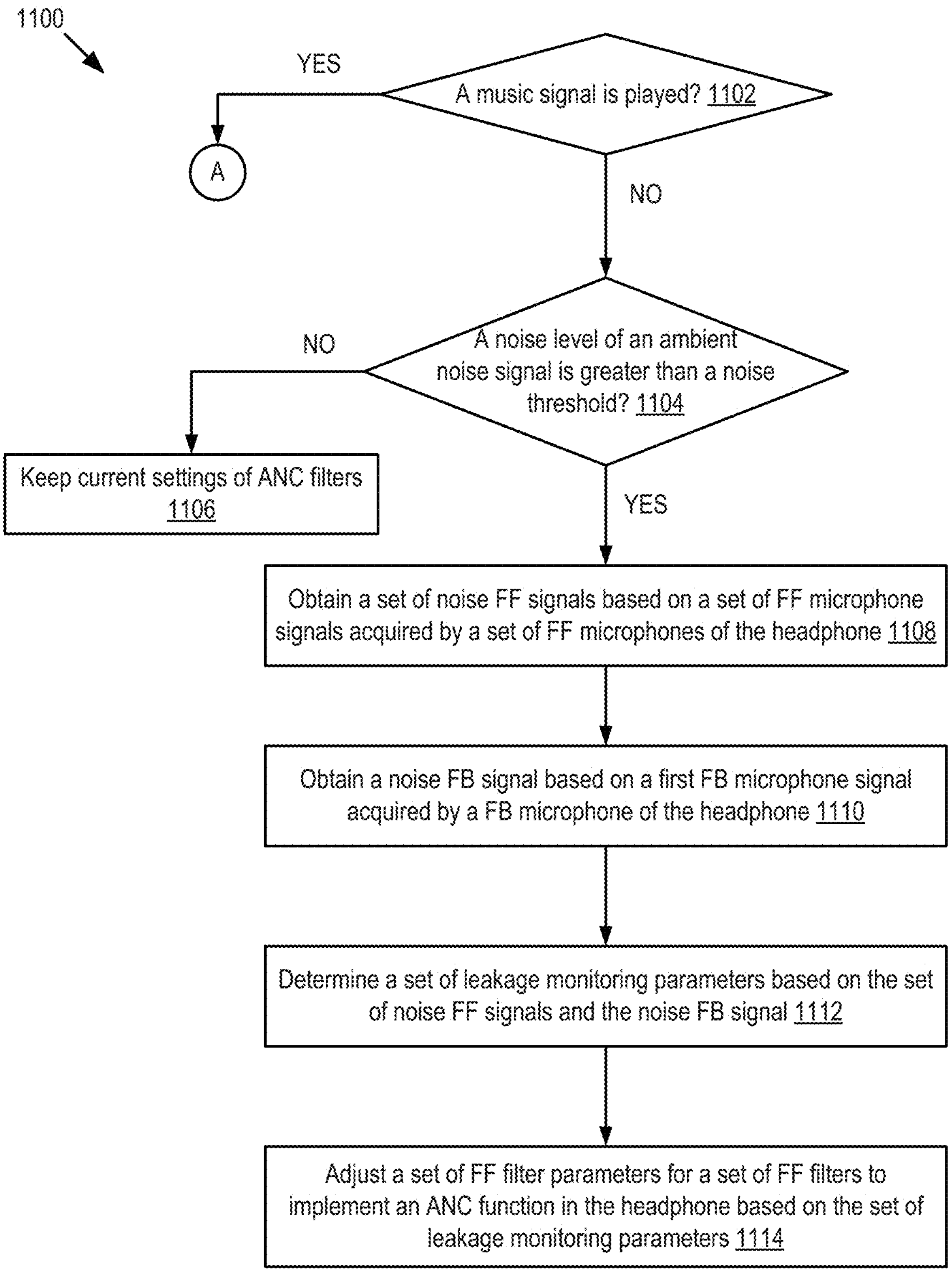
FIGS. 11A-11B illustrate a flowchart of an exemplary ANC method for a headphone, according to some aspects of the present disclosure.
Figure 11B:
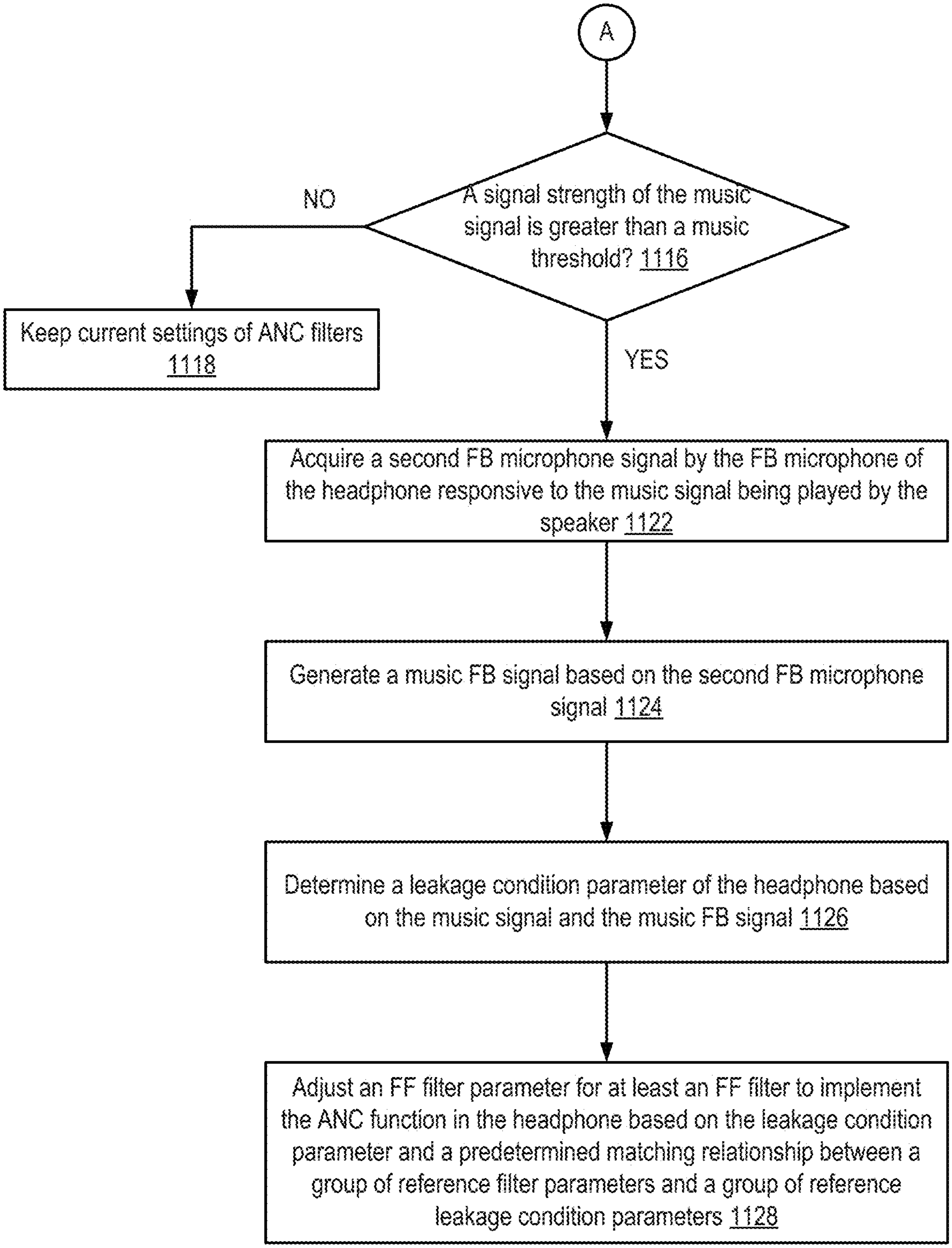

FIGS. 11A-11B illustrate a flowchart of an exemplary ANC method 1100 for a headphone, according to some aspects of the present disclosure. Method 1100 may be implemented by a processor (e.g., processor 102) or any other suitable component of the headphone. It is understood that the operations shown in method 1100 may not be exhaustive and that other operations can be performed as well before, after, or between any of the illustrated operations. Further, some of the operations may be performed simultaneously, or in a different order than shown in FIGS. 11A-11B.

Referring to FIG. 11A, method 1100 starts at operation 1102, in which it is determined whether a music signal is played by a speaker of the headphone. Responsive to the music signal being played by the speaker, method 1100 proceeds to operation 1116 of FIG. 11B. Otherwise, method 1100 proceeds to operation 1104.

At operation 1104 as illustrated in FIG. 11A, it is determined whether a noise level of an ambient noise signal is greater than a noise threshold. Responsive to the noise level being greater than the noise threshold, method 1100 may proceed to operation 1108. Otherwise, method 1100 may proceed to operation 1106.

At operation 1106 as illustrated in FIG. 11A, current settings of ANC filters (e.g., a set of FF filters) in the headphone can be kept unchanged.

At operation 1108 as illustrated in FIG. 11A, a set of noise FF signals may be obtained based on a set of FF microphone signals acquired by a set of FF microphones of the headphone.

Method 1100 proceeds to operation 1110 as illustrated in FIG. 11A, in which a noise FB signal is obtained based on a first FB microphone signal acquired by a FB microphone of the headphone.

Method 1100 proceeds to operation 1112 as illustrated in FIG. 11A, in which a set of leakage monitoring parameters is determined based on the set of noise FF signals and the noise FB signal.

Method 1100 proceeds to operation 1114 as illustrated in FIG. 11A, in which a set of FF filter parameters for a set of FF filters is adjusted to implement an ANC function in the headphone based on the set of leakage monitoring parameters.

Referring to FIG. 11B, at operation 1116, it is determined whether a signal strength of the music signal in a frequency band of interest is greater than a music threshold. Responsive to the signal strength of the music signal being greater than the music threshold, method 1100 proceeds to operation 1122. Otherwise, method 1100 proceeds to operation 1118.

At operation 1118 as illustrated in FIG. 11B, the current settings of the ANC filters (e.g., the set of FF filters) can be kept unchanged.

At operation 1122 as illustrated in FIG. 11B, a second FB microphone signal is acquired by the FB microphone of the headphone responsive to the music signal being played by the speaker.

Method 1100 proceeds to operation 1124 as illustrated in FIG. 11B, in which a music FB signal is generated based on the second FB microphone signal.

Method 1100 proceeds to operation 1126 as illustrated in FIG. 11B, in which a leakage condition parameter of the headphone is determined based on the music signal and the music FB signal.

Method 1100 proceeds to operation 1128 as illustrated in FIG. 11B, in which an FF filter parameter for at least an FF filter in the set of FF filters is adjusted to implement the ANC function in the headphone based on the leakage condition parameter and a predetermined matching relationship between a group of reference filter parameters and a group of reference leakage condition parameters.

Figure 12A:
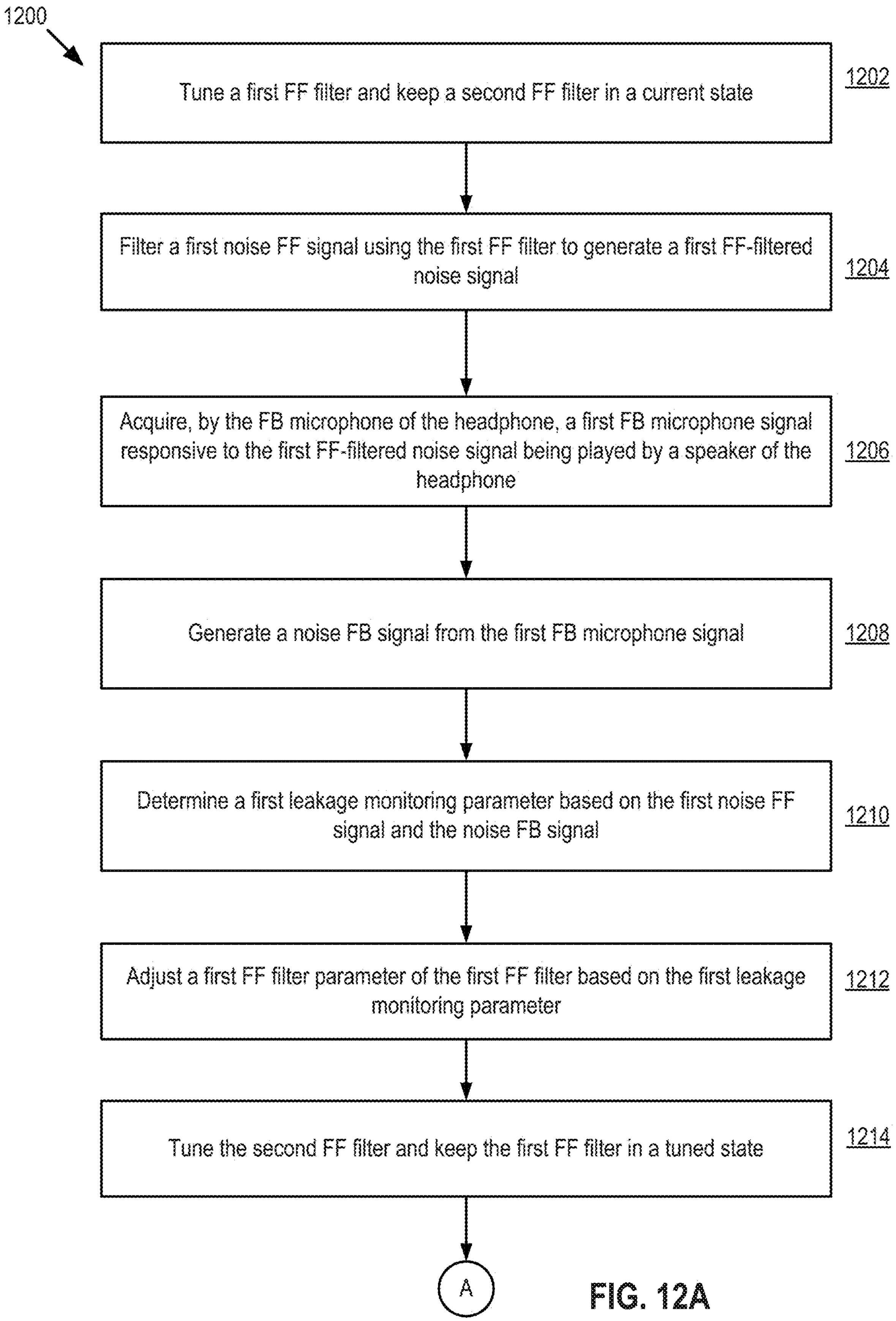
FIGS. 12A-12B illustrate a flowchart of an exemplary method for obtaining a noise FB signal and determining a set of leakage monitoring parameters sequentially for a headphone, according to some aspects of the present disclosure.
Figure 12B:
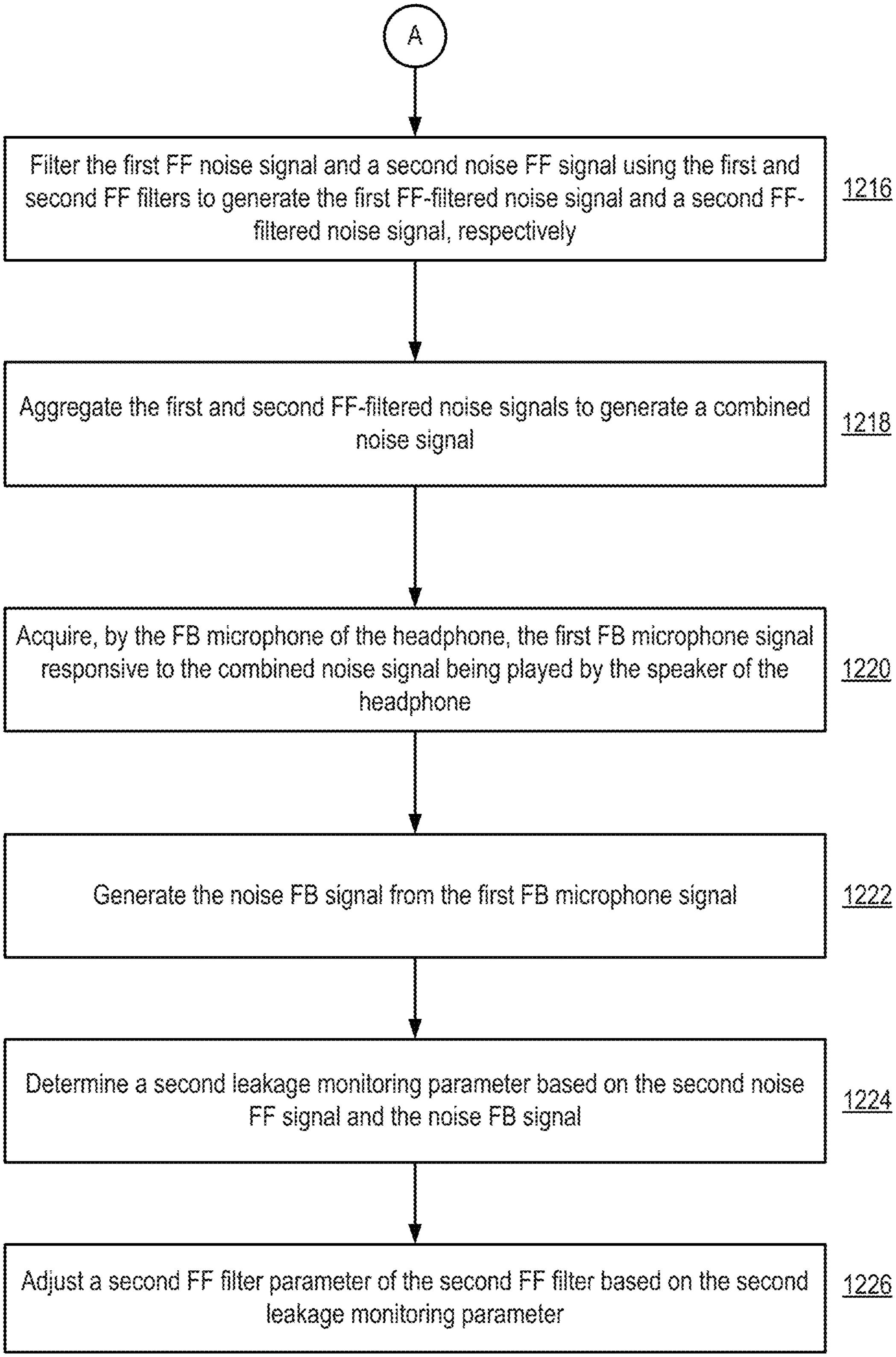

FIGS. 12A-12B illustrate a flowchart of an exemplary method 1200 for obtaining a noise FB signal and determining a set of leakage monitoring parameters sequentially for a headphone, according to some aspects of the present disclosure. Method 1200 may be implemented by a processor (e.g., processor 102) or any other suitable component of the headphone. It is understood that the operations shown in method 1200 may not be exhaustive and that other operations can be performed as well before, after, or between any of the illustrated operations. Further, some of the operations may be performed simultaneously, or in a different order than shown in FIGS. 12A-12B.

Method 1200 may be an exemplary implementation of operations 1108-1114 in FIG. 11A. The headphone of FIGS. 12A-12B includes an FF loop with two FF paths by way of examples. It is contemplated that method 1200 may be applied to any headphone having an FF loop with any number of FF paths, which is not limited herein.

Referring to FIG. 12A, method 1200 starts at operation 1202, in which a first FF filter in a first FF path of the headphone is tuned, and a second FF filter in a second FF path of the headphone is kept in a current state.

Method 1200 proceeds to operation 1204, as illustrated in FIG. 12A, in which a first noise FF signal in the first FF path is filtered using the first FF filter to generate a first FF-filtered noise signal.

Method 1200 proceeds to operation 1206, as illustrated in FIG. 12A, in which a first FB microphone signal is acquired by an FB microphone of the headphone responsive to the first FF-filtered noise signal being played by a speaker of the headphone.

Method 1200 proceeds to operation 1208, as illustrated in FIG. 12A in which a noise FB signal is generated from the first FB microphone signal.

Method 1200 proceeds to operation 1210, as illustrated in FIG. 12A, in which a first leakage monitoring parameter is determined based on the first noise FF signal and the noise FB signal.

Method 1200 proceeds to operation 1212, as illustrated in FIG. 12A, in which a first FF filter parameter of the first FF filter is adjusted based on the first leakage monitoring parameter.

Method 1200 proceeds to operation 1214, as illustrated in FIG. 12A, in which the second FF filter is tuned, where the first FF filter is kept in its tuned state.

Method 1200 proceeds to operation 1216, as illustrated in FIG. 12B, in which the first noise FF signal in the first FF path and a second noise FF signal in the second FF path are filtered using the first and second FF filters to generate the first FF-filtered noise signal and a second FF-filtered noise signal, respectively.

Method 1200 proceeds to operation 1218, as illustrated in FIG. 12B, in which the first and second FF-filtered noise signals are aggregated to generate a combined noise signal.

Method 1200 proceeds to operation 1220, as illustrated in FIG. 12B, in which the first FB microphone signal is acquired by the FB microphone responsive to the combined noise signal being played by the speaker.

Method 1200 proceeds to operation 1222, as illustrated in FIG. 12B, in which the noise FB signal is generated from the first FB microphone signal.

Method 1200 proceeds to operation 1224, as illustrated in FIG. 12B, in which a second leakage monitoring parameter is determined based on the second noise FF signal and the noise FB signal.

Method 1200 proceeds to operation 1226, as illustrated in FIG. 12B, in which a second FF filter parameter of the second FF filter is adjusted based on the second leakage monitoring parameter.

Figure 13:
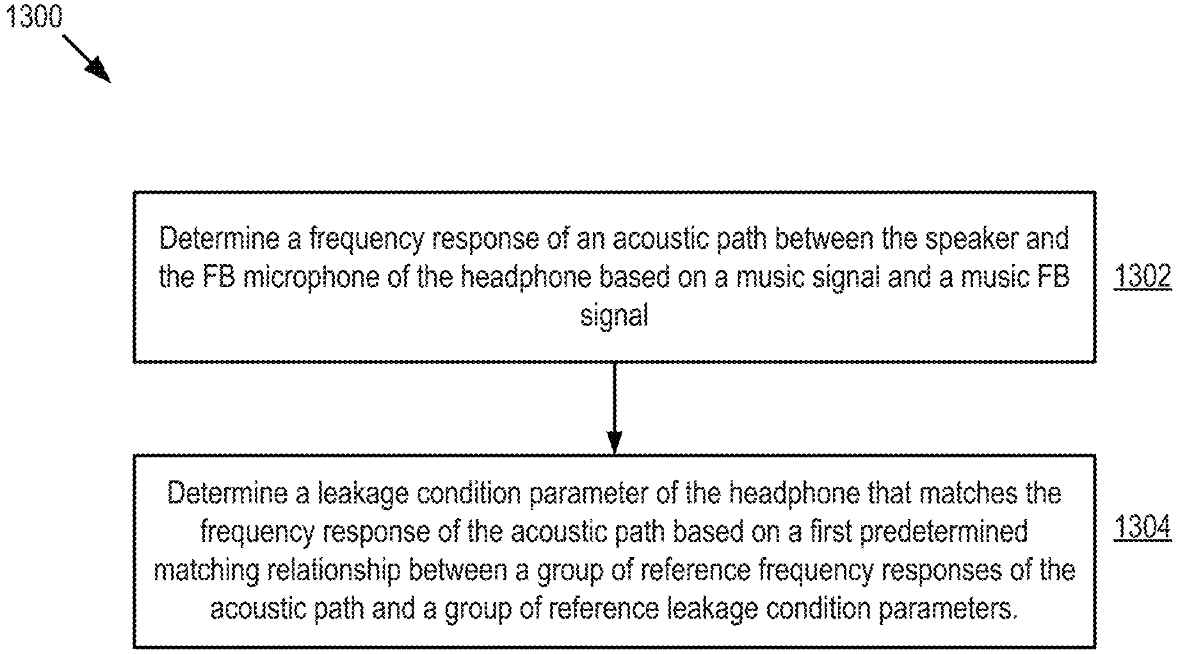
FIG. 13 illustrates a flowchart of an exemplary method for determining a leakage condition parameter of a headphone based on a music signal and a music FB signal, according to some aspects of the present disclosure.

FIG. 13 illustrates a flowchart of an exemplary method 1300 for determining a leakage condition parameter of a headphone based on a music signal and a music FB signal, according to some aspects of the present disclosure. Method 1300 may be an exemplary implementation of operation 1126 in FIG. 11B. Method 1300 may be implemented by a processor (e.g., processor 102) or any other suitable component of the headphone. It is understood that the operations shown in method 1300 may not be exhaustive and that other operations can be performed as well before, after, or between any of the illustrated operations. Further, some of the operations may be performed simultaneously, or in a different order than shown in FIG. 13.

Referring to FIG. 13, method 1300 starts at operation 1302, in which a frequency response of an acoustic path between the speaker and the FB microphone of the headphone is determined based on a music signal and a music FB signal.

Method 1300 proceeds to operation 1304, as illustrated in FIG. 13, in which a leakage condition parameter of the headphone that matches the frequency response of the acoustic path is determined based on a first predetermined matching relationship between a group of reference frequency responses of the acoustic path and a group of reference leakage condition parameters.

According to one aspect of the present disclosure, an ANC method for a headphone is disclosed. It is determined whether a music signal is played by a speaker of the headphone. Responsive to the music signal not being played by the speaker and a noise level of an ambient noise signal being greater than a noise threshold, a set of noise FF signals is obtained based on a set of FF microphone signals acquired by a set of FF microphones of the headphone. A noise FB signal is obtained based on a first FB microphone signal acquired by a FB microphone of the headphone. A set of leakage monitoring parameters is obtained based on the set of noise FF signals and the noise FB signal. A set of FF filter parameters for a set of FF filters to implement an ANC function in the headphone is adjusted based on the set of leakage monitoring parameters.

In some implementations, the set of FF microphones includes an FF microphone configured to acquire an FF microphone signal based on the ambient noise signal. The set of noise FF signals includes a noise FF signal generated from the FF microphone signal. The set of FF filters includes an FF filter. Determining the set of leakage monitoring parameters based on the set of noise FF signals and the noise FB signal includes determining a leakage monitoring parameter based on the noise FF signal and the noise FB signal.

In some implementations, determining the leakage monitoring parameter based on the noise FF signal and the noise FB signal includes: filtering the noise FF signal using a first bandpass filter to generate a bandpass-filtered noise FF signal; filtering the noise FB signal using a second bandpass filter to generate a bandpass-filtered noise FB signal; and generating the leakage monitoring parameter based on the bandpass-filtered noise FF signal and the bandpass-filtered noise FB signal.

In some implementations, adjusting the set of FF filter parameters associated with the set of FF filters includes adjusting an FF filter parameter of the FF filter based on the leakage monitoring parameter by: responsive to the leakage monitoring parameter being positive, reducing a gain of the FF filter or adjusting another parameter of the FF filter to make the leakage monitoring parameter fall within a predetermined range; or responsive to the leakage monitoring parameter being negative, increasing the gain of the FF filter or adjusting the other parameter of the FF filter to make the leakage monitoring parameter fall within the predetermined range.

In some implementations, the set of FF filters is tuned sequentially, the set of leakage monitoring parameters is determined sequentially based on the sequential tuning of the set of FF filters, and the set of FF filter parameters for the set of FF filters is adjusted sequentially based on the sequential determination of the set of leakage monitoring parameters.

In some implementations, the set of FF microphones includes a first FF microphone configured to acquire a first FF microphone signal based on the ambient noise signal and a second FF microphone configured to acquire a second FF microphone signal based on the ambient noise signal. The set of noise FF signals includes a first noise FF signal generated from the first FF microphone signal and a second noise FF signal generated from the second FF microphone signal. The set of FF filters includes a first FF filter and a second FF filter. Obtaining the noise FB signal includes: tuning the first FF filter and keeping the second FF filter in a current state; filtering the first noise FF signal using the first FF filter to generate a first FF-filtered noise signal; acquiring, by the FB microphone of the headphone, the first FB microphone signal responsive to the FF-filtered noise signal being played by the speaker of the headphone; and generating the noise FB signal from the first FB microphone signal. Determining the set of leakage monitoring parameters includes determining a first leakage monitoring parameter based on the first noise FF signal and the noise FB signal, wherein the first leakage monitoring parameter is used to adjust a first FF filter parameter of the first FF filter.

In some implementations, responsive to the first FF filter parameter of the first FF filter is adjusted based on the first leakage monitoring parameter, obtaining the noise FB signal further includes: keeping the first FF filter in a tuned state and tuning the second FF filter; filtering the first and second noise FF signals using the first and second FF filters to generate the first FF-filtered noise signal and a second FF-filtered noise signal, respectively; aggregating the first and second FF-filtered noise signals to generate a combined noise signal; acquiring, by the FB microphone of the headphone, the first FB microphone signal responsive to the combined noise signal being played by the speaker of the headphone; and generating the noise FB signal from the first FB microphone signal Determining the set of leakage monitoring parameters further includes determining a second leakage monitoring parameter based on the second noise FF signal and the noise FB signal, wherein the second leakage monitoring parameter is used to adjust a second FF filter parameter of the second FF filter.

In some implementations, responsive to the music signal being played by the speaker and a signal strength of the music signal in a predetermined frequency band being greater than a music threshold, a second FB microphone signal is acquired by the FB microphone of the headphone responsive to the music signal being played by the speaker. A music FB signal is generated based on the second FB microphone signal. A leakage condition parameter of the headphone is determined based on the music signal and the music FB signal.

In some implementations, determining the leakage condition parameter of the headphone based on the music signal and the music FB signal includes: determining a frequency response of an acoustic path between the speaker and the FB microphone of the headphone based on the music signal and the music FB signal; and determining the leakage condition parameter of the headphone that matches the frequency response of the acoustic path based on a first predetermined matching relationship between a group of reference frequency responses of the acoustic path and a group of reference leakage condition parameters.

In some implementations, an FF filter parameter for at least one of the set of FF filters to implement the ANC function in the headphone is adjusted based on (a) the leakage condition parameter and (b) a second predetermined matching relationship between a group of reference filter parameters and a group of reference leakage condition parameters.

According to another aspect of the present disclosure, a headphone with an ANC function is disclosed. The headphone includes a speaker configured to play at least one of a music signal or an ambient noise signal. The headphone includes a set of FF microphone configured to acquire a set of FF microphone signals. The headphone further includes an FB microphone configured to acquire a first FB microphone signal responsive to the ambient noise signal being played by the speaker. The headphone further includes a set of FF filters configured to implement the ANC function in the headphone. The headphone additionally includes a processor configured to determine whether the music signal is played by the speaker of the headphone. Responsive to the music signal not being played by the speaker and a noise level of the ambient noise signal being greater than a noise threshold, the processor is further configured to obtain a set of noise FF signals based on the set of FF microphone signals; obtain a noise FB signal based on the first FB microphone signal; determine a set of leakage monitoring parameters based on the set of noise FF signals and the noise FB signal; and adjust a set of FF filter parameters for the set of FF filters based on the set of leakage monitoring parameters.

In some implementations, the set of FF microphones includes an FF microphone configured to acquire an FF microphone signal based on the ambient noise signal. The set of noise FF signals includes a noise FF signal generated from the FF microphone signal. The set of FF filters includes an FF filter. To determine the set of leakage monitoring parameters based on the set of noise FF signals and the noise FB signal, the processor is further configured to determine a leakage monitoring parameter based on the noise FF signal and the noise FB signal.

In some implementations, to determine the leakage monitoring parameter based on the noise FF signal and the noise FB signal, the processor is further configured to: filter the noise FF signal using a first bandpass filter to generate a bandpass-filtered noise FF signal; filter the noise FB signal using a second bandpass filter to generate a bandpass-filtered noise FB signal; and generate the leakage monitoring parameter based on the bandpass-filtered noise FF signal and the bandpass-filtered noise FB signal.

In some implementations, to adjust the set of FF filter parameters associated with the set of FF filters, the processor is configured to adjust an FF filter parameter of the FF filter based on the leakage monitoring parameter by: responsive to the leakage monitoring parameter being positive, reducing a gain of the FF filter or adjusting another parameter of the FF filter to make the leakage monitoring parameter fall within a predetermined range; or responsive to the first leakage monitoring parameter being negative, increasing the gain of the FF filter or adjusting the other parameter of the FF filter to make the leakage monitoring parameter fall within the predetermined range.

In some implementations, the set of FF filters are tuned sequentially, the set of leakage monitoring parameters are determined sequentially based on the sequential tuning of the set of FF filters, and the set of FF filter parameters for the set of FF filters are adjusted sequentially based on the sequential determination of the set of leakage monitoring parameters.

In some implementations, the set of FF microphones includes a first FF microphone configured to acquire a first FF microphone signal based on the ambient noise signal and a second FF microphone configured to acquire a second FF microphone signal based on the ambient noise signal. The set of noise FF signals includes a first noise FF signal generated from the first FF microphone signal and a second noise FF signal generated from the second FF microphone signal. The set of FF filters includes a first FF filter and a second FF filter. To obtain the noise FB signal, the processor is further configured to: tune the first FF filter and keep the second FF filter in a current state; filter the first noise FF signal using the first FF filter to generate a first FF-filtered noise signal; and generate the noise FB signal from the first FB microphone signal that is acquired by the FB microphone of the headphone responsive to the first FF-filtered noise signal being played by the speaker of the headphone. To determine the set of leakage monitoring parameters, the processor is further configured to determine a first leakage monitoring parameter based on the first noise FF signal and the noise FB signal, where the first leakage monitoring parameter is used to adjust a first FF filter parameter of the first FF filter.

In some implementations, responsive to the first FF filter parameter of the first FF filter is adjusted based on the first leakage monitoring parameter, to obtain the noise FB signal, the processor is further configured to keep the first FF filter in a tuned state and tune the second FF filter; filter the first and second noise FF signals using the first and second FF filters to generate the first FF-filtered noise signal and a second FF-filtered noise signal, respectively; aggregate the first and second FF-filtered noise signals to generate a combined noise signal; and generate the noise FB signal from the first FB microphone signal that is acquired by the FB microphone of the headphone responsive to the combined noise signal being played by the speaker of the headphone. To determine the set of leakage monitoring parameters, the processor is further configured to determine a second leakage monitoring parameter based on the second noise FF signal and the noise FB signal, where the second leakage monitoring parameter is used to adjust a second FF filter parameter of the second FF filter.

In some implementations, the processor is further configured to: responsive to the music signal being played by the speaker and a signal strength of the music signal in a predetermined frequency band being greater than a music threshold, generate a music FB signal based on a second FB microphone signal acquired by the FB microphone of the headphone responsive to the music signal being played by the speaker; determine a leakage condition parameter of the headphone based on the music signal and the music FB signal; and adjust the set of FF filter parameters for the set of FF filters to implement the ANC function in the headphone based on the leakage condition parameter.

In some implementations, to determine the leakage condition parameter of the headphone based on the music signal and the music FB signal, the processor is further configured to: determine a frequency response of an acoustic path between the speaker and the FB microphone of the headphone based on the music signal and the music FB signal; and determine the leakage condition parameter of the headphone that matches the frequency response of the acoustic path based on a first predetermined matching relationship between a group of reference frequency responses of the acoustic path and a group of reference leakage condition parameters.

According to yet another aspect of the present disclosure, an ANC system for a headphone is disclosed. The ANC system includes a memory storing code and a processor coupled to the memory. When the code is executed, the processor is configured to determine whether a music signal is played by a speaker of the headphone. Responsive to the music signal not being played by the speaker and a noise level of an ambient noise signal being greater than a noise threshold, the processor is further configured to: obtain a set of noise FF signals based on a set of FF microphone signals acquired by a set of FF microphones of the headphone; obtain a noise FB signal based on a first FB microphone signal acquired by an FB microphone of the headphone; determine a set of leakage monitoring parameters based on the set of noise FF signals and the noise FB signal; and adjust a set of FF filter parameters for a set of FF filters to implement an ANC function in the headphone based on the set of leakage monitoring parameters.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. An active noise control (ANC) method for a headphone, comprising:

determining whether a music signal is played by a speaker of the headphone; and responsive to the music signal not being played by the speaker and a noise level of an ambient noise signal being greater than a noise threshold, obtaining a set of noise feedforward (FF) signals based on a set of FF microphone signals acquired by a set of FF microphones of the headphone;

obtaining a noise feedback (FB) signal based on a first FB microphone signal acquired by a FB microphone of the headphone;

determining a set of leakage monitoring parameters based on the set of noise FF signals and the noise FB signal which are obtained when the music signal is not played by the speaker; and adjusting a set of FF filter parameters for a set of FF filters to implement an ANC function in the headphone based on the set of leakage monitoring parameters, wherein the set of FF filters is tuned sequentially, the set of leakage monitoring parameters is determined sequentially based on the sequential tuning of the set of FF filters, and the set of FF filter parameters for the set of FF filters is adjusted sequentially based on the sequential determination of the set of leakage monitoring parameters.

2. The ANC method of claim 1, wherein:

the set of FF microphones comprises an FF microphone configured to acquire an FF microphone signal based on the ambient noise signal;

the set of noise FF signals comprises a noise FF signal generated from the FF microphone signal;

the set of FF filters comprises an FF filter; and determining the set of leakage monitoring parameters based on the set of noise FF signals and the noise FB signal comprises:

determining a leakage monitoring parameter based on the noise FF signal and the noise FB signal.

3. The ANC method of claim 2, wherein determining the leakage monitoring parameter based on the noise FF signal and the noise FB signal comprises:

filtering the noise FF signal using a first bandpass filter to generate a bandpass-filtered noise FF signal;

filtering the noise FB signal using a second bandpass filter to generate a bandpass-filtered noise FB signal; and generating the leakage monitoring parameter based on the bandpass-filtered noise FF signal and the bandpass-filtered noise FB signal.

4. The ANC method of claim 2, wherein adjusting the set of FF filter parameters associated with the set of FF filters comprises:

adjusting an FF filter parameter of the FF filter based on the leakage monitoring parameter by:

responsive to the leakage monitoring parameter being positive, reducing a gain of the FF filter or adjusting another parameter of the FF filter to make the leakage monitoring parameter falls within a predetermined range; or responsive to the leakage monitoring parameter being negative, increasing the gain of the FF filter or adjusting the other parameter of the FF filter to make the leakage monitoring parameter falls within the predetermined range.

5. The ANC method of claim 1, wherein:

the set of FF microphones comprises a first FF microphone configured to acquire a first FF microphone signal based on the ambient noise signal and a second FF microphone configured to acquire a second FF microphone signal based on the ambient noise signal;

the set of noise FF signals comprises a first noise FF signal generated from the first FF microphone signal and a second noise FF signal generated from the second FF microphone signal;

the set of FF filters comprises a first FF filter and a second FF filter;

obtaining the noise FB signal comprises:

tuning the first FF filter and keeping the second FF filter in a current state;

filtering the first noise FF signal using the first FF filter to generate a first FF-filtered noise signal;

acquiring, by the FB microphone of the headphone, the first FB microphone signal responsive to the FF-filtered noise signal being played by the speaker of the headphone; and generating the noise FB signal from the first FB microphone signal; and determining the set of leakage monitoring parameters comprises:

determining a first leakage monitoring parameter based on the first noise FF signal and the noise FB signal, wherein the first leakage monitoring parameter is used to adjust a first FF filter parameter of the first FF filter.

6. The ANC method of claim 5, wherein responsive to the first FF filter parameter of the first FF filter is adjusted based on the first leakage monitoring parameter, obtaining the noise FB signal further comprises:

keeping the first FF filter in a tuned state and tuning the second FF filter;

filtering the first and second noise FF signals using the first and second FF filters to generate the first FF-filtered noise signal and a second FF-filtered noise signal, respectively;

aggregating the first and second FF-filtered noise signals to generate a combined noise signal;

acquiring, by the FB microphone of the headphone, the first FB microphone signal responsive to the combined noise signal being played by the speaker of the headphone; and generating the noise FB signal from the first FB microphone signal; and determining the set of leakage monitoring parameters further comprises:

determining a second leakage monitoring parameter based on the second noise FF signal and the noise FB signal, wherein the second leakage monitoring parameter is used to adjust a second FF filter parameter of the second FF filter.

7. The ANC method of claim 1, further comprising:

responsive to the music signal being played by the speaker and a signal strength of the music signal in a predetermined frequency band being greater than a music threshold, acquiring a second FB microphone signal by the FB microphone of the headphone responsive to the music signal being played by the speaker;

generating a music FB signal based on the second FB microphone signal; and determining a leakage condition parameter of the headphone based on the music signal and the music FB signal.

8. The ANC method of claim 7, wherein determining the leakage condition parameter of the headphone based on the music signal and the music FB signal comprises:

determining a frequency response of an acoustic path between the speaker and the FB microphone of the headphone based on the music signal and the music FB signal; and determining the leakage condition parameter of the headphone that matches the frequency response of the acoustic path based on a first predetermined matching relationship between a group of reference frequency responses of the acoustic path and a group of reference leakage condition parameters.

9. The ANC method of claim 7, further comprising:

adjusting an FF filter parameter for at least one of the set of FF filters to implement the ANC function in the headphone based on the leakage condition parameter and a second predetermined matching relationship between a group of reference filter parameters and a group of reference leakage condition parameters.

10. A headphone with an active noise control (ANC) function, comprising:

a speaker configured to play at least one of a music signal or an ambient noise signal;

a set of feedforward (FF) microphone configured to acquire a set of FF microphone signals;

a feedback (FB) microphone configured to acquire a first FB microphone signal responsive to the ambient noise signal being played by the speaker;

a set of FF filters configured to implement the ANC function in the headphone; and a processor configured to:

determine whether the music signal is played by the speaker of the headphone; and responsive to the music signal not being played by the speaker and a noise level of the ambient noise signal being greater than a noise threshold, obtain a set of noise FF signals based on the set of FF microphone signals;

obtain a noise FB signal based on the first FB microphone signal;

determine a set of leakage monitoring parameters based on the set of noise FF signals and the noise FB signal which are obtained when the music signal is not played by the speaker; and adjust a set of FF filter parameters for the set of FF filters based on the set of leakage monitoring parameters, wherein the set of FF filters is tuned sequentially, the set of leakage monitoring parameters is determined sequentially based on the sequential tuning of the set of FF filters, and the set of FF filter parameters for the set of FF filters is adjusted sequentially based on the sequential determination of the set of leakage monitoring parameters.

11. The headphone of claim 10, wherein:

the set of FF microphones comprises an FF microphone configured to acquire an FF microphone signal based on the ambient noise signal;

the set of noise FF signals comprises a noise FF signal generated from the FF microphone signal;

the set of FF filters comprises an FF filter; and to determine the set of leakage monitoring parameters based on the set of noise FF signals and the noise FB signal, the processor is further configured to:

determine a leakage monitoring parameter based on the noise FF signal and the noise FB signal.

12. The headphone of claim 11, wherein to determine the leakage monitoring parameter based on the noise FF signal and the noise FB signal, the processor is further configured to:

filter the noise FF signal using a first bandpass filter to generate a bandpass-filtered noise FF signal;

filter the noise FB signal using a second bandpass filter to generate a bandpass-filtered noise FB signal; and generate the leakage monitoring parameter based on the bandpass-filtered noise FF signal and the bandpass-filtered noise FB signal.

13. The headphone of claim 11, wherein to adjust the set of FF filter parameters associated with the set of FF filters, the processor is configured to:

adjust an FF filter parameter of the FF filter based on the leakage monitoring parameter by:

responsive to the leakage monitoring parameter being positive, reducing a gain of the FF filter or adjusting another parameter of the FF filter to make the leakage monitoring parameter falls within a predetermined range; or responsive to the leakage monitoring parameter being negative, increasing the gain of the FF filter or adjusting the other parameter of the FF filter to make the leakage monitoring parameter falls within the predetermined range.

14. The headphone of claim 10, wherein:

the set of FF microphones comprises a first FF microphone configured to acquire a first FF microphone signal based on the ambient noise signal and a second FF microphone configured to acquire a second FF microphone signal based on the ambient noise signal;

the set of noise FF signals comprises a first noise FF signal generated from the first FF microphone signal and a second noise FF signal generated from the second FF microphone signal;

the set of FF filters comprises a first FF filter and a second FF filter;

to obtain the noise FB signal, the processor is further configured to:

tune the first FF filter and keep the second FF filter in a current state;

filter the first noise FF signal using the first FF filter to generate a first FF-filtered noise signal; and generate the noise FB signal from the first FB microphone signal that is acquired by the FB microphone of the headphone responsive to the first FF-filtered noise signal being played by the speaker of the headphone; and to determine the set of leakage monitoring parameters, the processor is further configured to:

determine a first leakage monitoring parameter based on the first noise FF signal and the noise FB signal, wherein the first leakage monitoring parameter is used to adjust a first FF filter parameter of the first FF filter.

15. The headphone of claim 14, wherein responsive to the first FF filter parameter of the first FF filter is adjusted based on the first leakage monitoring parameter, to obtain the noise FB signal, the processor is further configured to:

keep the first FF filter in a tuned state and tune the second FF filter;

filter the first and second noise FF signals using the first and second FF filters to generate the first FF-filtered noise signal and a second FF-filtered noise signal, respectively;

aggregate the first and second FF-filtered noise signals to generate a combined noise signal; and generate the noise FB signal from the first FB microphone signal that is acquired by the FB microphone of the headphone responsive to the combined noise signal being played by the speaker of the headphone; and to determine the set of leakage monitoring parameters, the processor is further configured to:

determine a second leakage monitoring parameter based on the second noise FF signal and the noise FB signal, wherein the second leakage monitoring parameter is used to adjust a second FF filter parameter of the second FF filter.

16. The headphone of claim 10, wherein the processor is further configured to:

responsive to the music signal being played by the speaker and a signal strength of the music signal in a predetermined frequency band being greater than a music threshold, generate a music FB signal based on a second FB microphone signal acquired by the FB microphone of the headphone responsive to the music signal being played by the speaker;

determine a leakage condition parameter of the headphone based on the music signal and the music FB signal; and adjust the set of FF filter parameters for the set of FF filters to implement the ANC function in the headphone based on the leakage condition parameter.

17. The headphone of claim 16, wherein to determine the leakage condition parameter of the headphone based on the music signal and the music FB signal, the processor is further configured to:

determine a frequency response of an acoustic path between the speaker and the FB microphone of the headphone based on the music signal and the music FB signal; and determine the leakage condition parameter of the headphone that matches the frequency response of the acoustic path based on a first predetermined matching relationship between a group of reference frequency responses of the acoustic path and a group of reference leakage condition parameters.

18. An active noise control (ANC) system for a headphone, comprising:

a memory storing code; and a processor coupled to the memory, wherein when the code is executed, the processor is configured to:

determine whether a music signal is played by a speaker of the headphone; and responsive to the music signal not being played by the speaker and a noise level of an ambient noise signal being greater than a noise threshold, obtain a set of noise feedforward (FF) signals based on a set of FF microphone signals acquired by a set of FF microphones of the headphone;

obtain a noise feedback (FB) signal based on a first FB microphone signal acquired by an FB microphone of the headphone;

determine a set of leakage monitoring parameters based on the set of noise FF signals and the noise FB signal which are obtained when the music signal is not played by the speaker; and adjust a set of FF filter parameters for a set of FF filters to implement an ANC function in the headphone based on the set of leakage monitoring parameters, wherein the set of FF filters is tuned sequentially, the set of leakage monitoring parameters is determined sequentially based on the sequential tuning of the set of FF filters. and the set of FF filter parameters for the set of FF filters is adjusted sequentially based on the sequential determination of the set of leakage monitoring parameters.

19. The ANC system of claim 18, wherein:

the set of FF microphones comprises an FF microphone configured to acquire an FF microphone signal based on the ambient noise signal;

the set of noise FF signals comprises a noise FF signal generated from the FF microphone signal;

the set of FF filters comprises an FF filter; and to determine the set of leakage monitoring parameters based on the set of noise FF signals and the noise FB signal, the processor is further configured to:

determine a leakage monitoring parameter based on the noise FF signal and the noise FB signal.

20. The ANC system of claim 19, wherein to determine the leakage monitoring parameter based on the noise FF signal and the noise FB signal, the processor is further configured to:

filter the noise FF signal using a first bandpass filter to generate a bandpass-filtered noise FF signal;

filter the noise FB signal using a second bandpass filter to generate a bandpass-filtered noise FB signal; and generate the leakage monitoring parameter based on the bandpass-filtered noise FF signal and the bandpass-filtered noise FB signal.

* * * * *